(12) United States Patent
Shimizu et al.

(10) Patent No.: US 11,050,091 B2
(45) Date of Patent: Jun. 29, 2021

(54) SOLID BATTERY, MANUFACTURING METHOD OF SOLID BATTERY, BATTERY PACK, VEHICLE, POWER STORAGE SYSTEM, POWER TOOL, AND ELECTRONIC EQUIPMENT

(71) Applicant: Murata Manufacturing Co., Ltd., Nagaokakyo (JP)

(72) Inventors: Keisuke Shimizu, Nagaokakyo (JP); Masamitsu Suzuki, Nagaokakyo (JP); Norio Fukasawa, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 210 days.

(21) Appl. No.: 16/394,350

(22) Filed: Apr. 25, 2019

(65) Prior Publication Data

US 2019/0252728 A1    Aug. 15, 2019

Related U.S. Application Data

(63) Continuation of application No. PCT/JP2017/028533, filed on Aug. 7, 2017.

(30) Foreign Application Priority Data

Nov. 8, 2016 (JP) .............................. JP2016-218273

(51) Int. Cl.
*H01M 10/0585* (2010.01)
*H01M 10/42* (2006.01)
(Continued)

(52) U.S. Cl.
CPC ......... *H01M 10/0585* (2013.01); *H01M 4/13* (2013.01); *H01M 4/139* (2013.01);
(Continued)

(58) Field of Classification Search
CPC . H01M 4/13; H01M 10/0562; H01M 10/0585
(Continued)

(56) References Cited

U.S. PATENT DOCUMENTS

2009/0193648 A1    8/2009   Inda
2010/0062343 A1*   3/2010   Harada .................. H01M 4/66
                                                    429/322
(Continued)

FOREIGN PATENT DOCUMENTS

JP    2009206090 A    9/2009
JP    2012227986 A    11/2012
(Continued)

OTHER PUBLICATIONS

Park et al. A review of conduction phenomena in Li-ion batteries. J. Power Sources, 2010. Retrieved from <URL: http://www.umich.edu/~amsl/publications/10JPSPark.pdf> (Year: 2010).*

(Continued)

*Primary Examiner* — James M Erwin
(74) *Attorney, Agent, or Firm* — Arent Fox LLP

(57) ABSTRACT

A solid battery including at least one first laminate body in which a first electrolyte layer, a first positive electrode layer, a first current collecting layer, and a second positive electrode layer are laminated in this order; at least one second laminate body in which a second electrolyte layer, a first negative electrode layer, a second current collecting layer, and a second negative electrode layer are laminated in this order; a first insulating layer connected to at least part of a side surface portion of the first laminate body; and a second insulating layer connected to at least part of a side surface portion of the second laminate body. Each of the first current collecting layer and the second current collecting layer has ionic conductivity of $10^{-7}$ S/cm or lower, and each of the
(Continued)

first insulating layer and the second insulating layer has ionic conductivity of $10^{-7}$ S/cm or lower.

18 Claims, 16 Drawing Sheets

(51) Int. Cl.
| | |
|---|---|
| H01M 4/13 | (2010.01) |
| H01M 4/66 | (2006.01) |
| H01M 4/139 | (2010.01) |
| H01M 10/0565 | (2010.01) |
| H01M 10/0562 | (2010.01) |
| H01M 50/20 | (2021.01) |
| B60L 50/64 | (2019.01) |
| B60K 6/28 | (2007.10) |

(52) U.S. Cl.
CPC ......... *H01M 4/66* (2013.01); *H01M 10/0562* (2013.01); *H01M 10/0565* (2013.01); *H01M 10/425* (2013.01); *H01M 50/20* (2021.01); *B60K 6/28* (2013.01); *B60L 50/64* (2019.02); *B60Y 2200/91* (2013.01); *B60Y 2200/92* (2013.01); *B60Y 2400/112* (2013.01); *H01M 2010/4271* (2013.01); *H01M 2220/20* (2013.01)

(58) Field of Classification Search
USPC .......................................................... 429/162
See application file for complete search history.

(56) References Cited

U.S. PATENT DOCUMENTS

| | | | |
|---|---|---|---|
| 2011/0183166 A1* | 7/2011 | Suga | H01M 10/0585 |
| | | | 429/61 |
| 2012/0315547 A1* | 12/2012 | Itoh | C08L 71/02 |
| | | | 429/312 |
| 2013/0149592 A1 | 6/2013 | Hayash et al. | |
| 2013/0149593 A1 | 6/2013 | Hayashi et al. | |
| 2014/0302390 A1 | 10/2014 | Miyake | |

FOREIGN PATENT DOCUMENTS

| | | |
|---|---|---|
| JP | WO2012020699 A1 | 10/2013 |
| JP | 2014116156 A | 6/2014 |
| JP | 2014203701 A | 10/2014 |
| JP | 2015095350 A | 5/2015 |
| JP | 2015162353 A | 9/2015 |
| WO | 2012020700 A1 | 2/2012 |
| WO | 2013038880 A1 | 3/2013 |
| WO | 2014050500 A1 | 4/2014 |

OTHER PUBLICATIONS

International Search Report issued for PCT/JP2017/028533, dated Nov. 7, 2017.
Written Opinion of the International Searching Authority issued for PCT/JP2017/028533, dated Nov. 7, 2017.

* cited by examiner

SOLID BATTERY, MANUFACTURING METHOD OF SOLID BATTERY, BATTERY PACK, VEHICLE, POWER STORAGE SYSTEM, POWER TOOL, AND ELECTRONIC EQUIPMENT

CROSS REFERENCE TO RELATED APPLICATIONS

The present application is a continuation of International application No. PCT/JP2017/028533, filed Aug. 7, 2017, which claims priority to Japanese Patent Application No. 2016-218273, filed Nov. 8, 2016, the entire contents of each of which are incorporated herein by reference.

FIELD OF THE INVENTION

The present invention relates to a solid battery. More specifically, the present invention relates to a stacked solid battery in which a positive electrode layer, a negative electrode layer, and an electrolyte layer between the positive electrode layer and the negative electrode layer are stacked.

BACKGROUND OF THE INVENTION

In recent years, a secondary battery of lithium ion and the like has been used as a power source for portable terminals, personal computers (PC), electric vehicles, and the like. In a lithium ion secondary battery, an electrolyte layer between a positive electrode and a negative electrode is immersed in an electrolytic solution of a combustible organic solvent. Accordingly, there is a danger that the electrolytic solution volatilizes and ignites, and further there are problems, such as that the capacity is small.

In response to these problems, researches on an all-solid battery, in which, for example, an oxide is used as a solid electrolyte material in an electrolyte layer and all constituents are solidified, have been extensively made. With such a configuration of the all-solid battery, there is no danger of ignition and it is possible to further increase the capacity. As described in, for example, Patent Document 1, this all-solid battery is produced by forming a laminate structure composed of constituents and sintering them all at once.

In the case of forming a laminate structure, as in a method for manufacturing a multilayer ceramic capacitor, each of laminate bodies (green sheets) obtained by laminating and printing a necessary electrode layer after a solid electrolyte material (a dielectric in the case of a ceramic capacitor) is formed on a release film, then released from the release film, and then the laminate bodies are laminated to manufacture the battery. In such a laminate type battery, high energy density can be achieved by obtaining a laminate structure, in which, for example, a current collecting layer is included, and a current collecting layer having a positive electrode layer disposed on both sides and a current collecting layer having a negative electrode layer disposed on both sides face each other through an electrolyte layer. Such a laminate structure is also used in general batteries.

On the other hand, for example, Patent Document 2 states that since a current collecting layer includes a specific conductive material that is conductive in an ion conducting manner, it is possible to be conductive between positive electrode layers or between negative electrode layers in the two adjacent unit cells in an ion conducting manner. This makes it possible to average potentials between adjacent ones of the positive electrode layers or the negative electrode layers via the current collecting layer, and a stable output voltage can be obtained.

Patent Document 1: Japanese Patent Application Laid-Open No. 2009-206090

Patent Document 2: Re-published WO2012/020699

SUMMARY OF THE INVENTION

However, in the technical field, solid batteries with battery characteristics and reliability that are improved further than those of the solid batteries according to the inventions proposed in Patent Documents 1 and 2 are desired at the present.

Accordingly, the present invention has been made in view of such a situation, and its main object is to provide a solid battery having excellent battery characteristics and excellent reliability.

The present invention provides a solid battery, including: at least one first laminate body in which a first electrolyte layer, a first positive electrode layer, a first current collecting layer, and a second positive electrode layer are laminated in this order; at least one second laminate body in which a second electrolyte layer, a first negative electrode layer, a second current collecting layer, and a second negative electrode layer are laminated in this order; a first insulating layer connected to at least part of a side surface portion of the at least one first laminate body; and a second insulating layer connected to at least part of a side surface portion of the at least one second laminate body. The first laminate body and the second laminate body being laminated along a main plane of the first electrolyte layer where the first positive electrode layer is not laminated thereto and a main plane of the second negative electrode layer where the second current collecting layer is not laminated thereto, or along a main plane of the second electrolyte layer where the first negative electrode layer is not laminated thereto and a main plane of the second positive electrode layer where the first current collecting layer is not laminated thereto. Each of the first current collecting layer and the second current collecting layer has ionic conductivity of $10^{-7}$ S/cm or lower, and each of the first insulating layer and the second insulating layer has ionic conductivity of $10^{-7}$ S/cm or lower.

Further, the present invention provides a solid battery, including at least one first laminate body in which a first electrolyte layer, a first positive electrode layer, a first current collecting layer, and a second positive electrode layer are laminated in this order; at least one third laminate body in which a third electrolyte layer and a third negative electrode layer are laminated; a first insulating layer connected to at least part of a side surface portion of the at least one first laminate body; and a third insulating layer connected to at least part of a side surface portion of the at least one third laminate body. The first laminate body and the third laminate body are laminated along a main plane of the first electrolyte layer where the first positive electrode layer is not laminated thereto and a main plane of the third negative electrode layer where the third electrolyte layer is not laminated thereto, or along a main plane of the third electrolyte layer where the third negative electrode layer is not laminated thereto and a main plane of the second positive electrode layer where the first current collecting layer is not laminated thereto. The first current collecting layer has ionic conductivity of $10^{-7}$ S/cm or lower, and each of the first insulating layer and the third insulating layer has ionic conductivity of $10^{-7}$ S/cm or lower.

Furthermore, the present invention provides a manufacturing method for a solid battery, the manufacturing method including applying a first electrolyte layer to a first release film; obtaining a first laminate body by laminating a first positive electrode layer, a first current collecting layer, and a second positive electrode layer on the first electrolyte layer in this order; connecting a first insulating layer to at least part of a side surface portion of the first laminate body; applying a second electrolyte layer to a second release film; obtaining a second laminate body by laminating a first negative electrode layer, a second current collecting layer, and a second negative electrode layer on the second electrolyte layer in this order; connecting a second insulating layer to at least part of a side surface portion of the second laminate body; releasing the first release film from the first laminate body; releasing the second release film from the second laminate body; and laminating the first laminate body and the second laminate body along a main plane of the first electrolyte layer where the first positive electrode layer is not laminated thereto and a main plane of the second negative electrode layer where the second current collecting layer is not laminated thereto, or along a main plane of the second electrolyte layer where the first negative electrode layer is not laminated thereto and a main plane of the second positive electrode layer where the first current collecting layer is not laminated thereto.

Further, the present invention provides a manufacturing method for a solid battery, the manufacturing method including applying a first electrolyte layer to a first release film; obtaining a first laminate body by laminating a first positive electrode layer, a first current collecting layer, and a second positive electrode layer on the first electrolyte layer in this order; connecting a first insulating layer to at least part of a side surface portion of the first laminate body; applying a third electrolyte layer to a third release film; obtaining a third laminate body by laminating a third negative electrode layer on the third electrolyte layer; connecting a third insulating layer to at least part of a side surface portion of the third laminate body; releasing the first release film from the first laminate body; releasing the third release film from the third laminate body; and laminating the first laminate body and the third laminate body along a main plane of the first electrolyte layer where the first positive electrode layer is not laminated thereto and a main plane of the third negative electrode layer where the third electrolyte layer is not laminated thereto, or along a main plane of the third electrolyte layer where the third negative electrode layer is not laminated thereto and a main plane of the second positive electrode layer where the first current collecting layer is not laminated thereto.

Furthermore, the present invention provides a battery pack including the solid battery according to the present invention; a control unit that controls a use state of the solid battery; and a switch unit that switches the use state of the solid battery according to an instruction of the control unit.

Further, the present invention provides a vehicle, including the solid battery according to the present invention; a driving force conversion device for receiving supply of electric power from the solid battery and converting the electric power into a driving force of a vehicle; a driving unit for driving in accordance with the driving force; and a vehicle control device for controlling the driving force.

Further, the present invention provides a power storage system, including a power storage device including the solid battery according to the present invention; a power consumption device to which power from the solid battery is supplied; a control device for controlling power supply from the solid battery to the power consumption device; and a power generation device for charging the solid battery.

Further, the present invention provides a power tool including the solid battery according to the present invention; and a movable portion to which electric power is supplied from the solid battery.

Further, the present invention provides electronic equipment including the solid battery according to the present invention, and receiving supply of power from the solid battery.

According to the present invention, it is possible to provide a solid battery with improved battery characteristics and reliability. It is to be noted that the effects described here are not necessarily limited, and any of the effects described in the present disclosure or effects different from those described in the present disclosure may be applied.

DETAILED DESCRIPTION OF THE INVENTION

Hereinafter, preferable modes for carrying out the present invention will be described. An embodiment described below shows an example of a representative embodiment of the present invention, and the scope of the present invention is not to be narrowly interpreted by the described embodiment.

1. First Embodiment (Configuration Example of All-Solid Battery)

A configuration example of an all-solid battery according to a first embodiment of the present invention will be described with reference to FIGS. 1 to 4.

1-1. Configuration Example of All-Solid Battery

Figure 1:
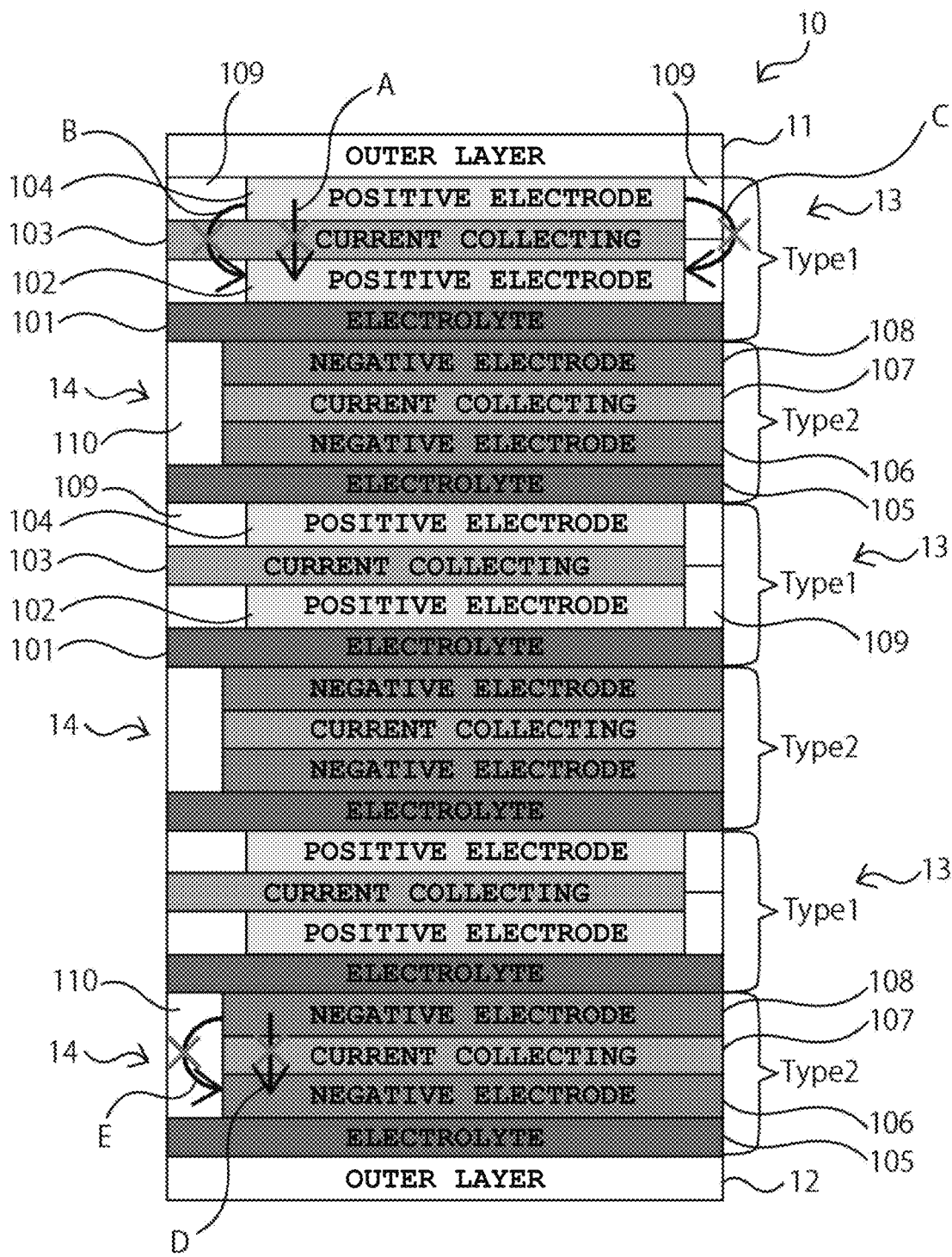
FIG. 1 is a cross-sectional view showing a configuration example of an all-solid battery according to a first embodiment of the present invention.

FIG. 1 is a cross-sectional view showing a configuration example of an all-solid battery 10 according to the first embodiment of the present invention. As shown in FIG. 1, in the all-solid battery 10, a plurality of first laminate bodies 13 (Type 1) and a plurality of second laminate bodies 14 (Type 2) are alternately laminated between an upper outer layer 11 and a lower outer layer 12.

In the first laminate body 13, a first electrolyte layer 101, a first positive electrode layer 102, a first current collecting layer 103, and a second positive electrode layer 104 are laminated in this order from a lower layer to an upper layer. In the second laminate body 14, a second electrolyte layer 105, a first negative electrode layer 106, a second current collecting layer 107, and a second negative electrode layer 108 are laminated in this order from a lower layer to an upper layer. A first insulating layer 109 and a second insulating layer 110 are provided on at least part of side surfaces of the first laminate body 13 and the second laminate body 14 so as to fill gaps between each layer.

In the present embodiment, on an upper surface of the second laminate body 14, a main plane of the first electrolyte layer 101 where the first positive electrode layer 102 is not laminated and a main plane of the second negative electrode layer 108 where the second current collecting layer 107 is not laminated are laminated. Further, on a lower surface of the second laminate body 14, a main plane of the second electrolyte layer 105 where the first negative electrode layer 106 is not laminated and a main plane of the second positive electrode layer 104 where the first current collecting layer 103 is not laminated are laminated.

(Electrolyte Layer)

The first electrolyte layer 101 and the second electrolyte layer 105 include a material having a glass transition point at 500° C. or lower. Then, a solid electrolyte layer may further include a solid electrolyte, and may further contain a binder, which will be described later, if necessary. Note that the first electrolyte layer 101 and the second electrolyte layer 105 have ionic conductivity of approximately $10^{-5}$ S/cm.

As the solid electrolyte, for example, one type or two or more types of crystalline solid electrolytes can be mentioned. A type of the crystalline solid electrolyte is not particularly limited as long as it is a crystalline solid electrolyte capable of conducting lithium ions, and is, for example, an inorganic material or a polymer material. Examples of the inorganic material include a sulfide, such as $Li_2S-P_2S_5$, $Li_2S-SiS_2-Li_3PO_4$, $Li_7P_3S_{11}$, $Li_{3.25}Ge_{0.25}P0.75S$, or $Li_{10}GeP_2S_{12}$, or an oxide, such as $Li_7La_3Zr_2O_{12}$, $Li_{6.75}La_3Zr_{1.75}Nb_{0.25}O_{12}$, $Li_6BaLa_2Ta_2O_{12}$, $Li_{1+x}Al_xTi_{2-x}(PO_4)_3$ or $La_{2/3-x}Li_{3x}TiO_3$. The polymer material is, for example, polyethylene oxide (PEO) or the like.

(Positive Electrode Layer)

The first positive electrode layer 102 and the second positive electrode layer 104 include a material having a glass transition point at 500° C. or lower. Then, the first positive electrode layer 102 and the second positive electrode layer 104 contain one kind or two or more kinds of positive electrode active materials, and if necessary, may contain additives, such as a binder and a conductive agent, and the solid electrolyte described above. Note that the first positive electrode layer 102 and the second positive electrode layer 104 have ionic conductivity of approximately $10^{-5}$ S/cm.

The positive electrode active material includes a positive electrode material capable of occluding and releasing a lithium ion as an electrode reactant. From the viewpoint of obtaining a high energy density, the positive electrode material is preferably a lithium-containing compound or the like, but is not limited to this. The lithium-containing compound is, for example, a composite oxide (lithium transition metal complex oxide) containing lithium and a transition metal element as constituent elements, a phosphoric acid compound (lithium transition metal phosphoric acid compound) containing lithium and a transition metal element as constituent elements and the like. Among them, the transition metal element is preferably one kind or two or more kinds of cobalt (Co), nickel (Ni), manganese (Mn) and iron (Fe). This is because a higher voltage can be obtained.

A chemical formula of the lithium transition metal complex oxide is represented by, for example, $Li_xM1O_2$ or $Li_yM2O_4$, and a chemical formula of the lithium transition metal phosphoric acid compound is represented by, for example, $Li_zM3PO_4$. However, M1 to M3 are one or more kinds of transition metal elements, and values of x to z are optional.

The lithium transition metal composite oxide is, for example, $LiCoO_2$, $LiNiO_2$, $LiVO_2$, $LiCrO_2$, $LiMn_2O_4$, or the like. The lithium transition metal phosphate compound is, for example, $LiFePO_4$, $LiCoPO_4$ or the like.

In addition, the positive electrode active material may be, for example, an oxide, a disulfide, a chalcogenide, a conductive polymer, or the like. The oxide is, for example, titanium oxide, vanadium oxide, manganese dioxide, or the like. The disulfide is, for example, titanium disulfide, molybdenum sulfide, or the like. The chalcogenide is, for example, niobium selenide or the like. The conductive polymer is, for example, sulfur, polyaniline, polythiophene, or the like.

The positive electrode active material may contain powder of positive electrode active material particles. A surface of the positive electrode active material particles may be coated with a coating agent. Here, a target of the coating is not limited to an entire surface of the positive electrode active material particle, but may be part of the surface of the positive electrode active material particle. The coating agent is, for example, at least one of a solid electrolyte and a conductive agent. By coating the surface of the positive electrode active material particles with the coating agent, interface resistance between the positive electrode active material and the solid electrolyte can be reduced. Further, since it is possible to suppress the collapse of the structure of the positive electrode active material, it is possible to expand a sweep potential width, to use a large amount of lithium for reaction, and to improve cycle characteristics.

The binder is one kind or two or more kinds of, for example, synthetic rubber, a polymer material, or the like. The synthetic rubber is, for example, styrene-butadiene rubber, fluorine rubber, ethylene propylene diene, or the like. The polymeric material is, for example, polyvinylidene fluoride, polyimide, or the like. Note that the binder is for bonding particles of a positive electrode active material and the like. However, when the positive electrode is sufficiently bonded by a material (glass material) having a glass transition point at 500° C. or lower, the positive electrode does not need to contain the binder.

The conductive agent includes, for example, a carbon material, metal, a metal oxide, a conductive polymer, or the like singly or in combination of two or more. The carbon material is, for example, graphite, carbon black, acetylene black, ketjen black, a carbon fiber, or the like. The metal oxide is, for example, $SnO_2$ or the like. Note that the conductive agent may be a material having conductivity, and is not limited to the above examples.

(Negative Electrode Layer)

The first negative electrode layer 106 and the second negative electrode layer 108 include a material having a glass transition point at 500° C. or lower. Then, the first negative electrode layer 106 and the second negative electrode layer 108 contain one kind or two or more kinds of negative electrode active materials, and if necessary, may contain additives, such as a binder and a conductive agent, and the solid electrolyte described above. Note that the first negative electrode layer 106 and the second negative electrode layer 108 have ionic conductivity of approximately $10^{-5}$ S/cm.

The negative electrode active material includes a negative electrode material capable of occluding and releasing a lithium ion as an electrode reactant. From the viewpoint of obtaining a high energy density, the negative electrode material is preferably a carbon material, a metal-based material or the like, but is not limited to this.

The carbon material is, for example, easily graphitizable carbon, non-graphitizable carbon, graphite, mesocarbon microbeads (MCMB), highly oriented graphite (HOPG), or the like.

The metal-based material is, for example, a material containing a metal element or a semimetal element capable of forming lithium and an alloy as a constituent element. More specifically, the metal-based material is, for example, one kind or two or more kinds of a single substance, an alloy, or a compound of silicon (Si), tin (Sn), aluminum (Al), indium (In), magnesium (Mg), boron (B), gallium (Ga), germanium (Ge), lead (Pb), bismuth (Bi), cadmium (Cd), silver (Ag), zinc (Zn), hafnium (Hf), zirconium (Zr), yttrium (Y), palladium (Pd), platinum (Pt), or the like. However, the single substance is not limited to have the purity of 100%, and it may contain trace amounts of impurities. The metal-based material is, for example, Si, Sn, $SiB_4$, $TiSi_2$, SiC, $Si_3N_4$, $SiO_v$ ($0<v\leq2$), LiSiO, $SnO_w$ ($0<w\leq2$), $SnSiO_3$, LiSnO, $Mg_2Sn$, or the like.

In addition, the metal-based material may be a lithium-containing compound or lithium metal (a single substance of lithium). This lithium-containing compound is a composite oxide (lithium transition metal composite oxide) containing lithium and a transition metal element as constituent elements, and is, for example, $Li_4Ti_5O_{12}$ or the like.

The negative electrode active material contains powder of the negative electrode active material particles. A surface of the negative electrode active material particles may be coated with a coating agent. Here, a target of the coating is not limited to an entire surface of the negative electrode active material particle, but may be part of the surface of the negative electrode active material particle. The coating agent is, for example, at least one of a solid electrolyte and a conductive agent. By coating the surface of the negative electrode active material particles with the coating agent, interface resistance between the negative electrode active material and the solid electrolyte can be reduced. Further, since it is possible to suppress the collapse of the structure of the negative electrode active material, it is possible to expand a sweep potential width, to use a large amount of lithium for reaction, and to improve cycle characteristics. The binder and the conductive agent are as described above.

(Current Collecting Layer)

The first current collecting layer 103 and the second current collecting layer 107 include a material having a glass transition point at 500° C. or lower. The first current collecting layer 103 and the second current collecting layer 107 may contain a material having high conductivity in addition to a material having a glass transition point at 500° C. or lower. For example, the first current collecting layer 103 and the second current collecting layer 107 may be configured with a general carbon material, such as carbon, graphite, a carbon nanotube, or the like, Cu, Mg, Ti, Fe, Co, Ni, Zn, Al, Ge, In, Au, Pt, Ag, Pd, or the like, or an alloy containing any of these elements. As a material contained in the current collecting layer for the negative electrode, the same material as that of the current collecting layer for the positive electrode can be used.

Further, the material constituting the current collecting layer for the positive electrode may be the same as or different from the material constituting the positive electrode layer. Moreover, the material constituting the current collecting layer for the negative electrode may be the same as or different from the material constituting the negative electrode layer.

Further, the first current collecting layer 103 and the second current collecting layer 107 may contain a positive electrode active material and a negative electrode active material, respectively. For example, a conductive carbon material (graphite) which is a negative electrode active material may be included in the current collecting layer for the negative electrode. A content ratio of the current collecting layer is not particularly limited as long as it functions as a current collecting layer, but it is preferable that a volume ratio of positive electrode current collector/positive electrode active material or negative electrode current collector/negative electrode active material is in the range of 90/10 to 70/30. The current collecting layer for the positive electrode and the current collecting layer for the negative electrode containing the positive electrode active material and the negative electrode active material, respectively, are desirable, since adhesion between the current collecting layer for the positive electrode and the positive electrode active material layer, and the current collecting layer for the negative electrode and the negative electrode active material layer is improved. The first current collecting layer 103 and the second current collecting layer 107 may further contain additives, such as a binder, if necessary.

The ionic conductivity of the first current collecting layer 103 and the second current collecting layer 107 of the present embodiment is set to $10^{-7}$ S/cm or lower. Further, it is preferable that the ionic conductivity of the first current collecting layer 103 and the second current collecting layer 107 of the present embodiment is set to $10^{-8}$ S/cm or lower.

(Insulating Layer)

The first insulating layer 109 and the second insulating layer 110 include a material having a glass transition point at 500° C. or lower. The first insulating layer 109 and the second insulating layer 110 may include an inorganic insulating material and/or an organic insulating material in addition to a material having a glass transition point at 500° C. or lower. Examples of the inorganic insulating material include aluminum oxide ($Al_2O_3$), silicon oxide ($SiO_2$), magnesium oxide (MgO), titanium oxide ($TiO_2$), zirconium oxide ($ZrO_2$), and the like, and examples of the organic insulating material include polyvinylidene fluoride, a copolymer of vinylidene fluoride and hexafluoropropylene, and the like. The first insulating layer 109 and the second insulating layer 110 may further contain additives, such as a binder, if necessary.

The first insulating layer 109 and the second insulating layer 110 have ionic conductivity set to $10^{-7}$ S/cm or lower. Further, it is preferable that the ionic conductivity of the first insulating layer 109 and the second insulating layer 110 is set to $10^{-8}$ S/cm or lower. Note that adjustment of the ionic conductivity is made according to a type and composition of a material.

Here, in a case where a laminate body including the positive electrode layer and a laminate body including the negative electrode layer are continuously laminated, if the current collecting layer has ion conductivity or the insulating layer has ion conductivity, lithium diffuses from an uncharged positive electrode layer on an uppermost surface of the laminate body to a lower positive electrode layer via the current collecting layer or the insulating layer during charging. For this reason, the negative electrode layer facing the positive electrode layer through the electrolyte layer is locally overcharged, and there is a possibility that a short-circuit or the like occurs inside the battery. Likewise, since, during charging, lithium diffuses to an uncharged negative electrode layer on a lowermost surface of the laminate body from a negative electrode layer on the negative electrode layer, the capacity of the laminate body including the negative electrode layer contributing to discharge decreases, which may lead to lowering in the capacity of the battery and the like.

In terms of the ionic conductivity in the present embodiment, the first current collecting layer 103 is sufficiently lower than the first positive electrode layer 102 and the second positive electrode layer 104 and the first insulating layer 109 is lower than the first electrolyte layer 101. For this reason, for example, in FIG. 1, during charging, the positive electrode active material, such as lithium, is not diffused from the uncharged second positive electrode layer 104 on the uppermost surface to the first positive electrode layer 102 via the first current collecting layer 103 (in a direction of an arrow A) or the first insulating layer 109 (in a direction of arrows B and C). In this manner, in the all-solid battery 10 of the present embodiment, it is possible to prevent the first negative electrode layer 108 facing the first positive electrode layer 102 from being locally overcharged via the first electrolyte layer 101, and occurrence of a short-circuit in the inside of the battery can be suppressed.

In terms of the ionic conductivity in the present embodiment, the second current collecting layer 107 is sufficiently lower than the first negative electrode layer 106 and the second negative electrode layer 108 and the second insulating layer 110 is lower than the second electrolyte layer 105. For this reason, for example, in FIG. 1, during charging, the negative electrode active material, such as lithium, is not diffused from the second negative electrode layer 108 to the uncharged first negative electrode layer 106 on a lowermost surface via the second current collecting layer 107 (in a direction of an arrow D) or the second insulating layer 110 (in a direction of an arrow E). In this manner, in the all-solid battery 10 of the present embodiment, it is possible to prevent the capacity of the second laminate body 14 of the lowermost layer contributing to the discharge from decreasing, and it is possible to suppress the decrease in the battery capacity.

Further, in a case where a laminated all-solid battery is manufactured, it has conventionally been necessary to separately prepare two kinds of laminate bodies in which the positive electrode or the negative electrode is disposed only on one side of the current collecting layer on the uppermost layer and the lowermost layer, in addition to preparing a laminate body in which the positive electrode or the negative electrode is disposed on the upper and lower surfaces of the current collecting layer. This is because, if a current collecting layer having an active material layer on both side is used on uppermost and lowermost surfaces, the active material layers of the uppermost layer and the lower layer become excessive, and participate in the battery reaction through the current collecting layer or the insulating layer. For this reason, it is necessary to prepare four kinds of laminate bodies in total. However, since ordinary laminating machines usually laminate about two to three kinds of laminate bodies, there has been a problem that, not only the number of kinds laminate bodies to be manufactured increases, but also the laminating machine is complicated.

In the all-solid battery 10 of the present embodiment, since only two types of the laminate bodies to be laminated, the first laminated body 13 and the second laminated body 14, are included, it is possible to simplify the printing process and the laminating process at the time of manufacturing the all-solid battery, as compared to one for which three or more types of laminate bodies are prepared. Further, the all-solid battery 10 of the present embodiment can also reduce the number of types of intermediate parts during manufacturing.

Note that, in the all-solid battery 10 of the present embodiment, the uppermost electrode is a positive electrode and the lowermost electrode is a negative electrode. However, the all-solid battery according to the present invention is not limited to the above, and the positive electrode layer and the negative electrode layer only need to be alternately laminated, and the electrode of the uppermost layer may be a negative electrode and the electrode of the lowermost layer may be a positive electrode, or both of the electrodes may be of the same type of electrodes.

1-2. Lamination Example of First Laminate Body

Figure 2:
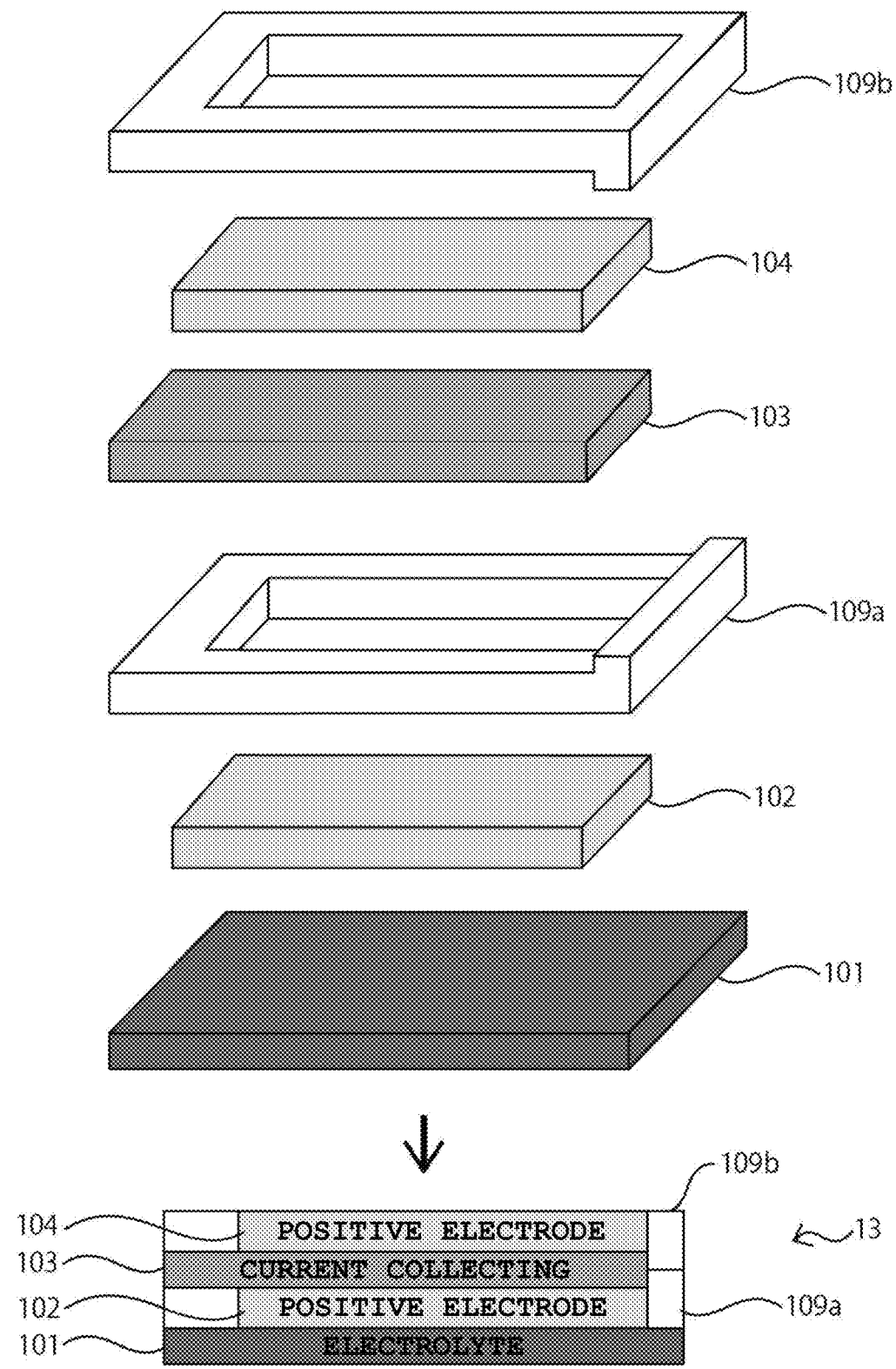
FIG. 2 is a schematic diagram showing a formation example of a first laminated body according to the first embodiment of the present invention.

FIG. 2 is a schematic diagram showing a formation example of the first laminate body 13 of the present embodiment. An example of a method of forming the first laminate body 13 will be described with reference to FIG. 2.

First, the first electrolyte layer 101 is applied to a first release film. Next, slurries of the first positive electrode layer 102, the first current collecting layer 103, the second positive electrode layer 104, a lower first insulating layer 109*a*, and an upper first insulating layer 109*b* are prepared. The prepared slurries of the first positive electrode layer 102, the lower first insulating layer 109*a*, the first current collecting layer 103, the second positive electrode layer 104, and the upper first insulating layer 109*b* are laminated and printed on the upper surface of the first electrolyte layer 101 in the above order and pattern by screen printing to form the first laminate body 13.

1-3. Lamination Example of Second Laminate Body

Figure 3:
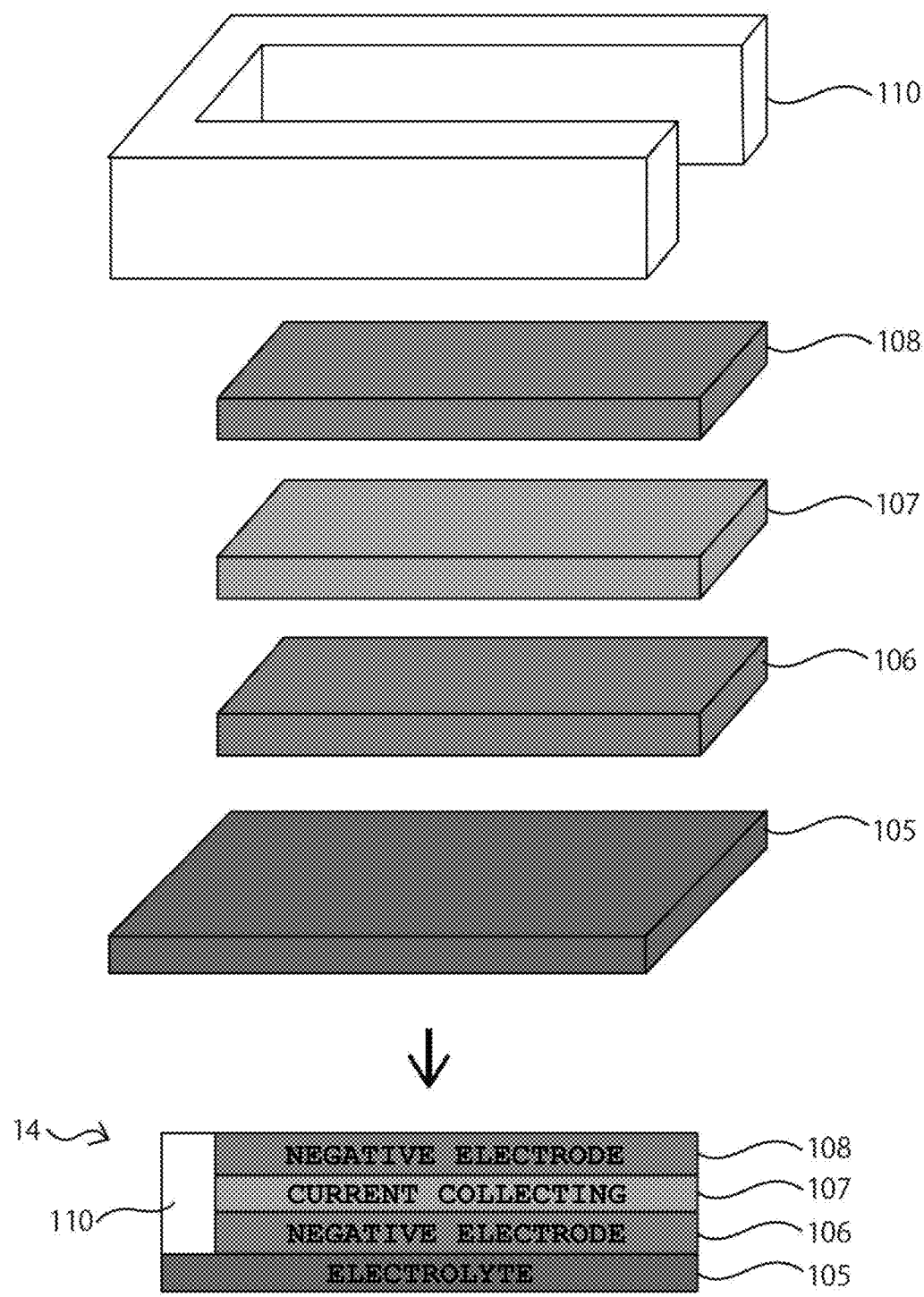
FIG. 3 is a schematic view showing a formation example of a second laminate body according to the first embodiment of the present invention.

FIG. 3 is a schematic diagram showing a formation example of the second laminate body 14 of the present embodiment. An example of a method of forming the second laminate body 14 will be described with reference to FIG. 3.

First, the second electrolyte layer 105 is applied to a second release film. Next, slurries of the first negative electrode layer 106, the second current collecting layer 107, the second negative electrode layer 108, and the second insulating layer 110 are prepared. Then, the prepared slurries of the first negative electrode layer 106, the second current collecting layer 107, the second negative electrode layer 108, and the second insulating layer 110 are laminated and printed on the upper surface of the second electrolyte layer 105 in the above order and pattern by screen printing to form the second laminate body 14.

1-4. Example of Manufacturing Method of All-Solid Battery

Figure 4:
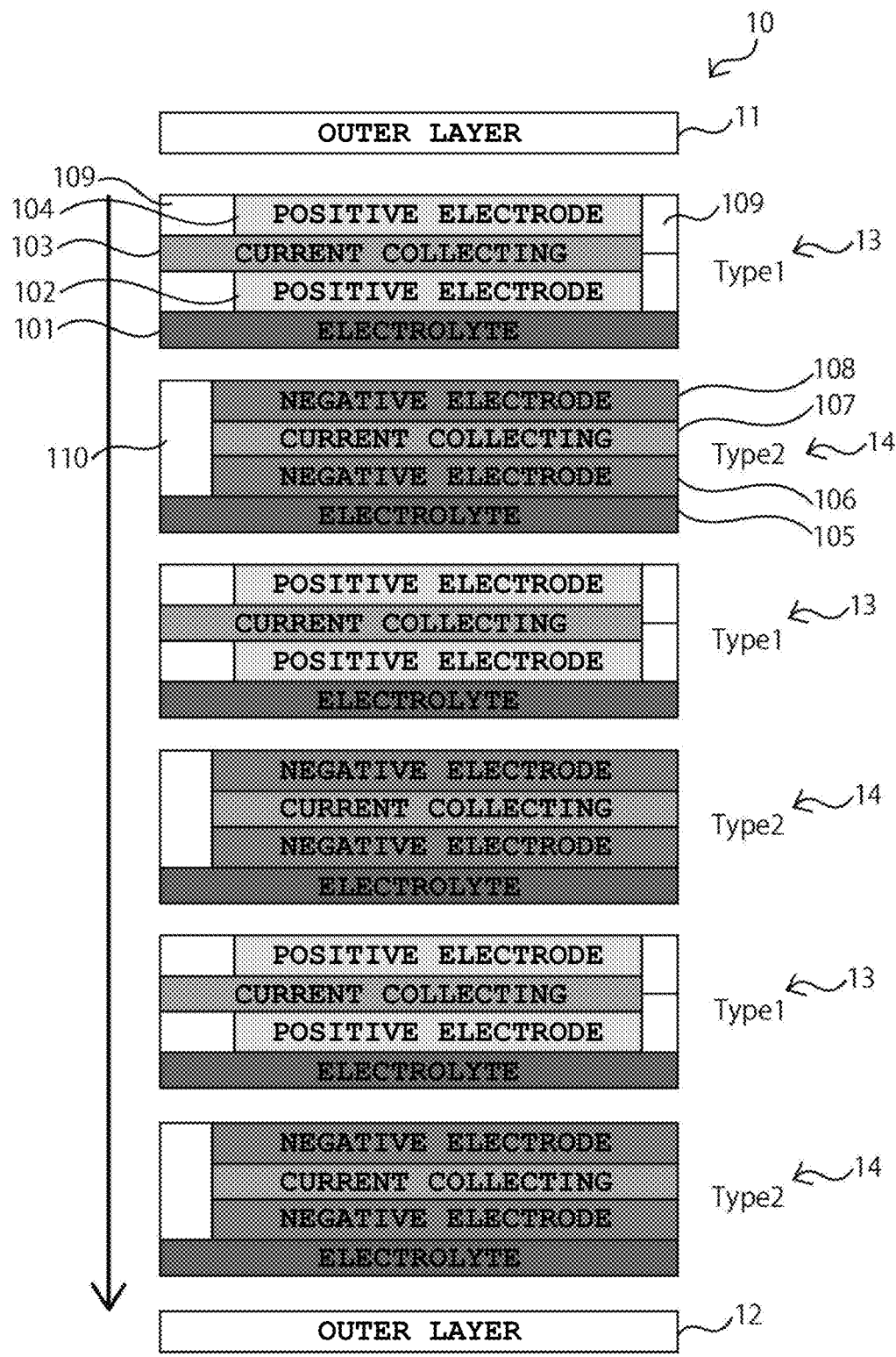
FIG. 4 is a cross-sectional view showing a lamination example of the all-solid battery according to the first embodiment of the present invention.

An example of a method for manufacturing method of the all-solid battery 10 of the present embodiment will be described with reference to FIGS. 1 to 4. FIG. 4 is a cross-sectional view showing a lamination example of the all-solid battery of the present embodiment.

First, as shown in FIG. 2, the first laminate body 13 is formed by the above-described forming method. In this manner, the first insulating layer 109 is connected to at least part of a side surface portion of the first laminate body 13.

Next, as shown in FIG. 3, the second laminate body 14 is formed by the above-described forming method. In this manner, the second insulating layer 110 is connected to at least part of the side surface portion of the second laminate body 14.

Then, the first release film is released from the first laminate body 13, and the second release film is released from the second laminate body 14.

Then, the first laminate body 13 and the second laminate body 14 that is a layer below the first laminate body 13 are laminated with a main plane of the first electrolyte layer 101 where the first positive electrode layer 102 is not laminated and a main plane of the second negative electrode layer 108 where the second current collecting layer 107 is not laminated. Similarly, the second laminate body 14 and the first laminate body 13 that is a layer below the second laminate body 14 are laminated with a main plane of the second electrolyte layer 105 where the first negative electrode layer 106 is not laminated and a main plane of the second positive electrode layer 104 where the first current collecting layer 103 is not laminated. These are repeated to form a laminate structure of the first laminate body 13 and the second laminate body 14.

Finally, an upper surface of the uppermost layer is joined with the upper outer layer 11, and a lower surface of the lowermost layer is joined with the lower outer layer 12 to manufacture the all-solid battery 10.

1-5. Example

As described below, the all-solid battery of an example according to the present invention was produced, and the ionic conductivity of the present example and a comparative example was evaluated.

(Method of Experiment)

[Preparation of Electrolyte Layer]

Step 1. A mixture of oxide glass (Li2O:SiO2:B2O3=54:11:35) and an acrylic binder in a weight ratio of 70:30 wt % is mixed with butyl acetate so that the solid content was 30 wt %, and agitated with 5-mmφ zirconia balls for four hours. The above is applied to the release film and dried at 80° C. for 10 minutes.

[Preparation of Positive Electrode Slurry]

Step 2. Mixtures of lithium cobalt oxide (LiCoO$_2$) manufactured by Aldrich with oxide glass (Li2O:SiO2:B2O3=54:11:35) at 50:50 wt % and with an acrylic binder at 80:20 wt % are mixed with terpineol so as to have a solid content of 60 wt %, and are agitated at 3000 rpm, for example, by THINKY MIXER, for one hour.

[Preparation of Negative Electrode Slurry]

Step 3. Mixtures of KS6 manufactured by TIMCAL with oxide glass (Li2O:SiO2:B2O3=54:11:35) at 50:50 wt % and with an acrylic binder at 80:20 wt % are mixed with terpineol so as to have a solid content of 60 wt %, and are agitated at 3000 rpm, for example, by THINKY MIXER, for one hour.

[Preparation of Current Collecting Layer Slurry]

Step 4. Mixtures of KS6 manufactured by TIMCAL with oxide glass (ASF1096, Bi—B-based glass manufactured by AGC Inc.) at 50:50 wt % and with an acrylic binder at 80:20 wt % are mixed with terpineol so as to have a solid content of 60 wt %, and are agitated at 3000 rpm, for example, by THINKY MIXER, for one hour.

[Preparation of Insulating Layer Slurry]

Step 5. Mixtures of alumina particles (AHP300 by Nippon Light Metal Co., Ltd) with oxide glass (ASF1096, Bi—B-based glass manufactured by AGC Inc.) at 50:50 wt % and with an acrylic binder at 80:20 wt % are mixed with terpineol so as to have a solid content of 60 wt %, and are agitated at 3000 rpm, for example, by THINKY MIXER, for one hour.

[Preparation of Insulating Layer]

Step 6. Mixtures of alumina particles (AHP300 by Nippon Light Metal Co., Ltd) with oxide glass (ASF1096, Bi—B-based glass manufactured by AGC Inc.) at 50:50 wt % and with an acrylic binder at 70:30 wt % are mixed with butyl acetate so as to have a solid content of 30 wt %, and are agitated together with 5-mmφ zirconia balls for four hours. The above is applied to the release film and dried at 80° C. for 10 minutes.

Step 7. Each slurry is laminated and printed by screen printing on the electrolyte layer prepared in the above experiment Step 1 in the order and pattern shown in FIG. 2 and FIG. 3, so as to form a first laminate (positive electrode green sheet) and a second laminate body (negative electrode green sheet).

Step 8. The positive electrode green sheet and the negative electrode green sheet prepared in the above experiment Step 7 are processed into a shape shown in the diagram, released from the release film, and laminated in the order listed below, and then heated at 100° C. for 10 minutes.

Step 9. With respect to the above experiment Step 8, heating is performed at 300° C. for ten hours to remove the acrylic binder, and then sintering is performed at 400° C. for 30 minutes.

Step 10. A Ag paste (DAIKEN CHEMICAL) is applied on both sides of the cell in the above experiment Step 9 and dried at 120° C. for 10 minutes.

Step 11. A similar prototype was made using oxide glass ($Li_2O:SiO_2:B_2O_3=54:11:35$) as the glass used for the current collecting layer slurry and the insulating layer slurry in the above experiment Steps 4 and 5.

Step 12. For the current collecting layer and the insulating layer, a thin film composed of each single substance was sintered, and the ion conductivity was measured.

Step 13. A current lead was attached to the terminal prepared in the above experiment Step 10, and charge and discharge evaluation was carried out.

Step 14. Cycle characteristics were evaluated for charging and discharging of the cell with Charging: 4.2 V, 0.1 C-CCCV 0.01 C cut, and Discharge: 0.1 C 2.0 V.

(Experiment result) The ionic conductivities of the thin films sintered using only the current collecting layer slurry or the insulating layer slurry in the above experimental Step 12 are shown in the following Table 1:

TABLE 1

| | Glass material | Ion conductivity |
|---|---|---|
| Current collecting layer A | Bi—B-based glass manufactured by AGC Inc. ASF1096 Glass 20 wt % | $<10^{-10}$ S/cm |
| Current collecting layer B | $Li_2O:SiO_2:B_2O_3 = 54:11:35$ Glass 20 wt % | $10^{-7}$ S/cm |
| Current collecting layer C | $Li_2O:SiO_2:B_2O_3 = 54:11:35$ Glass 50 wt % | $10^{-6}$ S/cm |
| Insulating layer A | Bi—B-based glass manufactured by AGC Inc. ASF1096 Glass 50 wt % | $<10^{-10}$ S/cm |
| Insulating layer B | $Li_2O:SiO_2:B_2O_3 = 54:11:35$ Glass 50 wt | $10^{-7}$ S/cm |
| Insulating layer C | $Li_2O:SiO_2:B_2O_3 = 54:11:35$ Glass 100 wt % | $10^{-6}$ S/cm |

From Table 1, the current collecting layer A and the insulating later A using Bi—B-based glass have ion conductivity of less than $10^{-10}$ S/cm, and the current collecting layers B and C and the insulating layers B and C using the oxide-based glass have ionic conductivities of $10^{-7}$ and $10^{-6}$ S/cm, respectively. From these facts, it was found that the ionic conductivity is higher when the oxide-based glass is used than when the Bi—B-based glass is used.

Next, results of 50 cycles of the cycle characteristic test in the above experiment Step 13 are shown in the following Table 2:

TABLE 2

| | Current collecting layer | Insulating layer | After 50 cycles |
|---|---|---|---|
| Embodiment 1 | A | A | No short circuit is generated |
| Embodiment 2 | B | B | No short circuit is generated |
| Embodiment 3 | A | B | No short circuit is generated |
| Embodiment 4 | B | A | No short circuit is generated |
| Comparative example 1 | C | C | Short circuit is generated at 5 cycles |
| Comparative example 2 | C | A | Short circuit is generated at 10 cycles |
| Comparative example 3 | A | C | Short circuit is generated at 45 cycles |

From Table 2, it was found that a short-circuit does not occur even after 50 cycles in a case where the current collecting layer A and the insulating layer A having ionic conductivity of $10^{-7}$ S/cm or less (first example) are used. Further, it was found that, in a case where at least one of the current collecting layer C or the insulating layer C having ionic conductivity of $10^{-6}$ S/cm is used (first to third comparative examples), a short-circuit occurs inside the battery during the cycle test.

From the results of the experiments described above, it can be said that the occurrence of a short-circuit inside the battery can be suppressed by using a current collecting layer and an insulating layer having ionic conductivity of $10^{-7}$ S/cm or less for the all-solid battery.

2. Second Embodiment (First Variation of All-Solid Battery)

Figure 5:
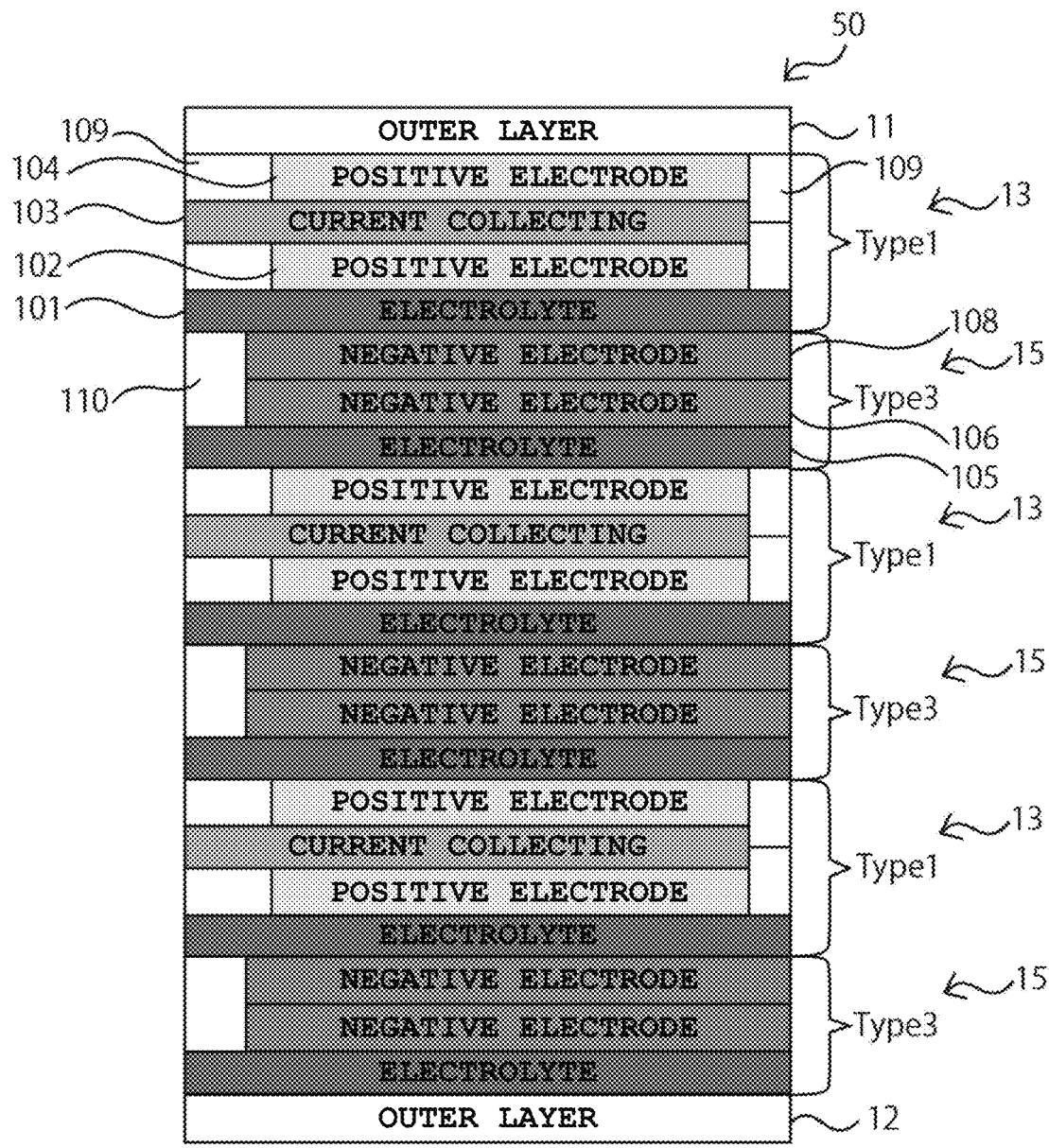
FIG. 5 is a cross-sectional view showing a configuration example of the all-solid battery according to a second embodiment of the present invention.

FIG. 5 is a cross-sectional view showing a configuration example of the all-solid battery according to a second embodiment to which the present invention is applied. With reference to FIG. 5, an all-solid battery 50 which is a first variation of the all-solid battery 10 of the first embodiment will be described. The all-solid battery 50 of the present embodiment is different from the all-solid battery 10 of the first embodiment in that the second current collecting layer is not formed in the second laminate body including the negative electrode layer. The other configurations of the all-solid battery 50, which are similar to those of the all-solid battery 10, will be omitted from the description here.

In a second laminate body 15 (Type 3) in the all-solid battery 50 of the present embodiment, the second electrolyte layer 105, the first negative electrode layer 106, and the second negative electrode layer 108 are laminated in this order from a lower layer to an upper layer. The second insulating layer 110 is provided on at least part of the side surface portion of the second laminate body 15 so as to fill a gap between each layer.

Even in a case where there is no current collecting layer in the second laminate body 15 as in the all-solid battery 50 of the present embodiment, the ion conductivity is high in the first negative electrode layer 106 and the second negative electrode layer 108, and electrons easily flow. Accordingly, an effect similar to that of the all-solid battery 10 of the first embodiment can be obtained.

3. Third Embodiment (Second Variation of All-Solid Battery)

Figure 6:
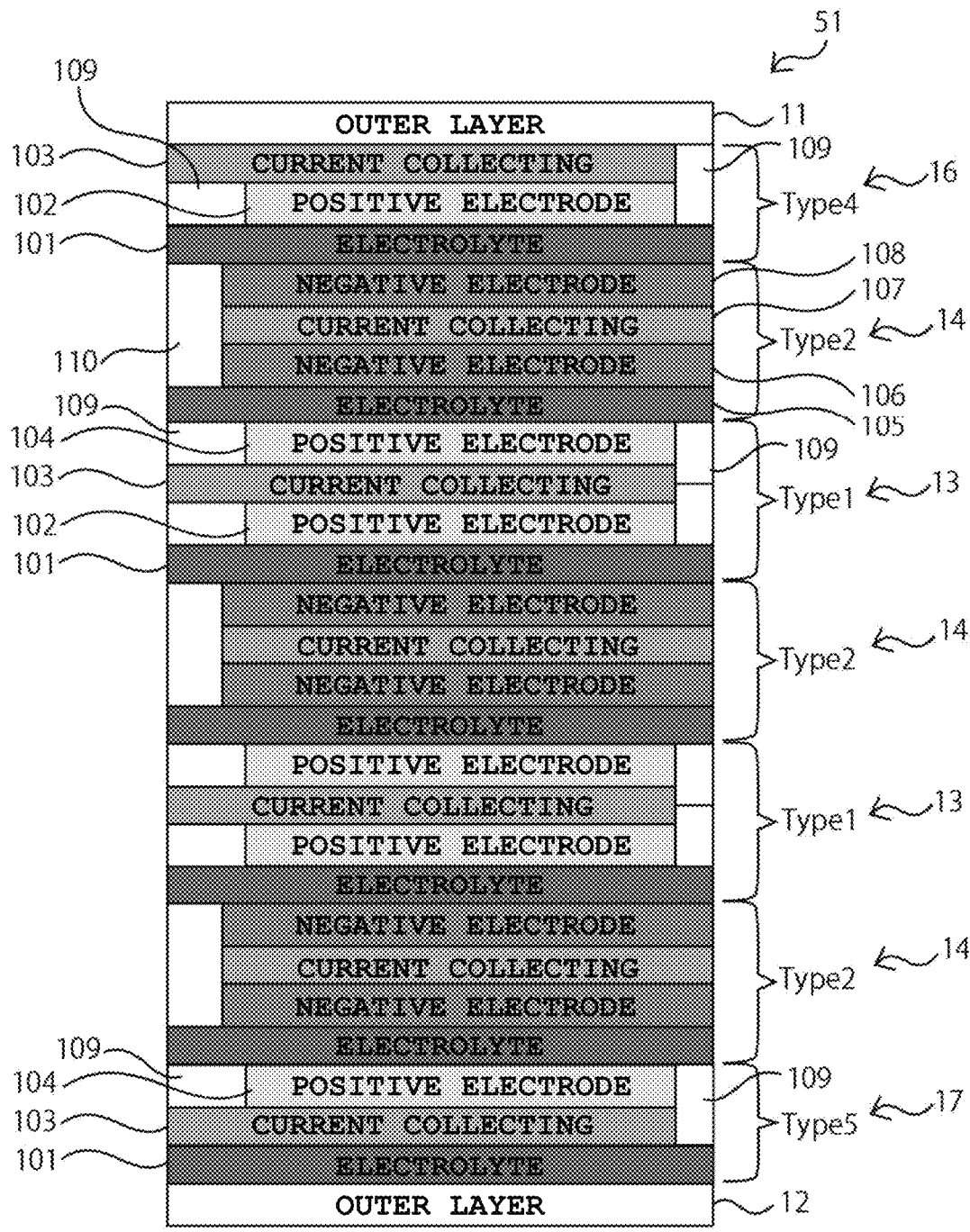
FIG. 6 is a cross-sectional view showing a configuration example of the all-solid battery according to a third embodiment of the present invention.

FIG. 6 is a cross-sectional view showing a configuration example of the all-solid battery according to a third embodiment to which the present invention is applied. With reference to FIG. 6, an all-solid battery 51 that is a second variation of the all-solid battery 10 of the first embodiment will be described. The all-solid battery 51 of the present embodiment is different from the all-solid battery 10 of the first embodiment in that the current collecting layer included in the laminate bodies of the uppermost layer and the lowermost layer has the electrode layer of the positive electrode or the negative electrode disposed only on one side. The other configurations of the all-solid battery 51, which are similar to those of the all-solid battery 10, will be omitted from the description here.

In a fourth laminate body 16 (Type 4) laminated on the uppermost layer in the all-solid battery 51, the first electrolyte layer 101, the first positive electrode layer 102, and the first current collecting layer 103 are laminated in this order from a lower layer to an upper layer. In a fifth laminate body 17 (Type 5) laminated on the lowermost layer in the all-solid battery 51, the first electrolyte layer 101, the first current collecting layer 103, and the second positive electrode layer 104 are laminated in this order from a lower layer to an upper layer. The first insulating layer 109 is provided on at least part of the side surface portions of the fourth laminate body 16 and the fifth laminate body 17 so as to fill a gap between each layer.

In the all-solid battery 51 of the present embodiment, there is no electrode layer on the uppermost and lowermost surfaces of a laminate body. Accordingly, unnecessary active materials do not flow into the current collecting layers and the insulating layers as the uppermost and lowermost layers during charging. In this manner, as similar to the all-solid battery 10 of the first embodiment, the all-solid battery 51 can suppress occurrence of a short-circuit inside the battery and decrease in the battery capacity.

4. Outline of Application of Solid Battery

The application of the solid battery will be described in detail. The application of the solid battery is not particularly limited as long as it is a machine, equipment, an apparatus, a device, and a system (an aggregate of a plurality of pieces of equipment or the like) that can use the solid battery as a power source for driving or a power storage source for accumulating electric power. The solid battery used as a power source may be a main power source (power source to be used preferentially) or an auxiliary power source (power source used instead of the main power source or switched from the main power source). When the solid battery is used as an auxiliary power source, a type of main power source is not limited to a solid battery.

The application of the solid battery is, for example, as follows: electronic equipment (including portable electronic equipment), such as a notebook computer, a tablet computer, a portable telephone (for example, a smartphone, or the like), a portable information terminal (Personal Digital Assistants: PDA), an imaging device (for example, a digital still camera, a digital video camera, or the like), audio equipment (for example, a portable audio player), a gaming machine, a cordless phone handset, an electronic book, an electronic dictionary, a radio, a headphone, a navigation system, a memory card, a pacemaker, a hearing aid, lighting equipment, a toy, medical equipment, a robot, or the like; a portable life instrument, such as an electric shaver; a storage device, such as a backup power source and a memory card; a power tool, such as an electric drill and an electric saw; a battery pack used for a notebook computer, or the like, as a removable power source; medical electronic equipment, such as a pacemaker and a hearing aid; a vehicle used for an electric vehicle (including a hybrid car), or the like; and a power storage system, such as a household battery system that stores electric power in preparation for emergency or the like. As a matter of course, the application may be other than the above.

Among the above, it is effective that the solid battery is applied to a battery pack, a vehicle, a power storage system, a power tool, and electronic equipment. Since excellent battery characteristics are required, it is possible to effectively improve the performance by using the solid battery of the present invention. Note that the battery pack is a power source using the solid battery, and is what is called an assembled battery, or the like. The vehicle is a vehicle that operates (travels) using the solid battery as a driving power source, and, as described above, may be a vehicle (a hybrid vehicle or the like) that also includes a driving source other than the solid battery. The power storage system is, for example, a power storage system for residential use, and is a system using the solid battery as a power storage source. In the power storage system, since electric power is stored in the solid battery which is the electric power storage source, power consumption devices, for example, electric appliances for household use can be used by utilizing the electric power. The power tool is a tool in which a movable part (such as a drill) can move using the solid battery as a power source for driving. The electronic equipment is equipment that exerts various functions by using the solid battery as a power source (power supply source) for driving.

Here, several application examples of the solid battery will be specifically described. Note that, since the configuration of each application example described below is merely an example, a modification can be made as appropriate.

5. Fourth Embodiment (Configuration Example of Battery Pack)

The battery pack according to a fourth embodiment of the present invention includes the solid battery according to the first embodiment of the present invention or the solid battery according to the third embodiment of the present invention, a control unit that controls a use state of the solid battery, and a switch unit for switching a use state of the solid battery according to an instruction from the control unit. The battery pack according to the fourth embodiment of the present invention includes the solid battery of the first embodiment according to the present invention having excellent battery characteristics and excellent reliability or the solid battery of the third embodiment according to the present invention, which leads to improvement in performance and reliability of the battery pack.

Hereinafter, the battery pack according to a fourth embodiment of the present invention will be described with reference to the drawings.

Figure 7:
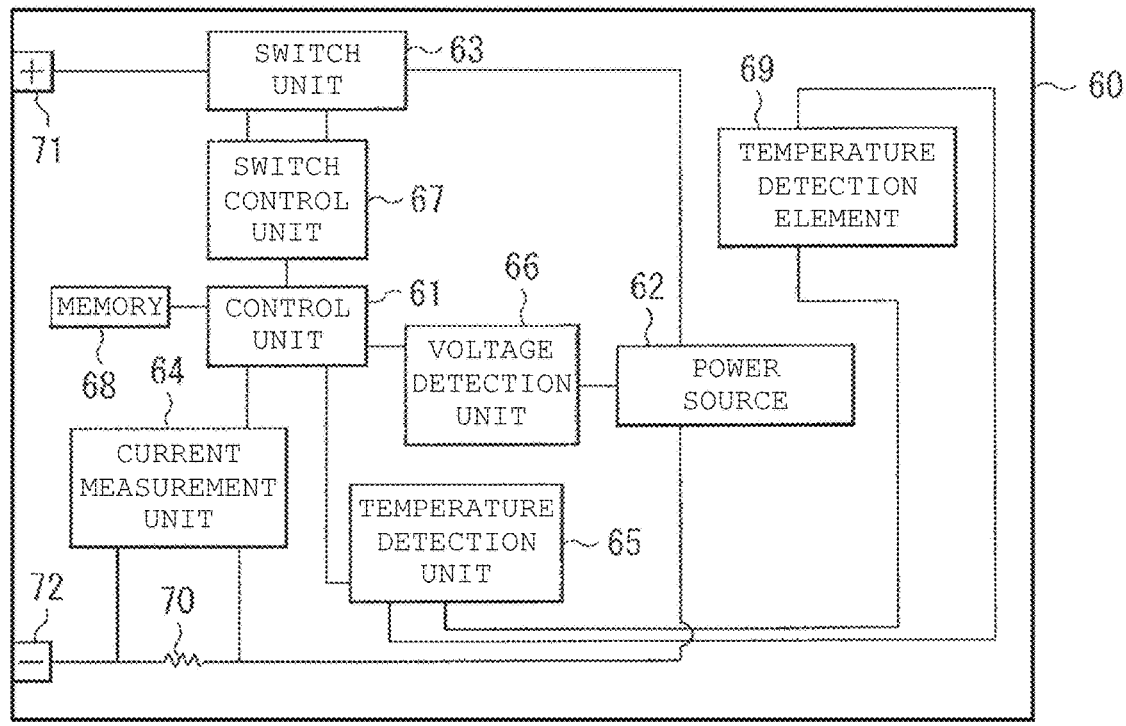
FIG. 7 is a block diagram showing a configuration example of a battery pack according to a fourth embodiment of the present invention.

FIG. 7 shows a block configuration of the battery pack. The battery pack includes, for example, a control unit 61, a power source 62, a switch unit 63, a current measurement unit 64, a temperature detection unit 65, a voltage detection unit 66, a switch control unit 67, a memory 68, a temperature detection element 69, a current detection resistor 70, a positive electrode terminal 71, and a negative electrode terminal 72, in the inside of a housing 60 formed of a plastic material, or the like.

The control unit 61 controls operation (including a use state of the power source 62) of the entire battery pack, and includes, for example, a central processing unit (CPU) and the like. The power source 62 includes one or two or more solid batteries (not shown). The power source 62 is, for example, an assembled battery including two or more solid batteries, and a connection form of these solid batteries may be in series, in parallel, or a mixed type of both. By way of example, the power source 62 includes six solid batteries connected in two-parallel three-series.

The switch unit 63 switches a use state (availability of connection between the power source 62 and external equipment) of the power source 62 according to an instruction of the control unit 61. The switch unit 63 includes, for example, a charge control switch, a discharge control switch, a charging diode, a discharging diode (none of which are shown), and the like. The charge control switch and the discharge control switch are, for example, semiconductor switches, such as a field effect transistor (MOSFET) using a metal oxide semiconductor.

The current measurement unit 64 measures a current using the current detection resistor 70 and outputs a measurement result to the control unit 61. The temperature detection unit 65 measures a temperature using the temperature detection element 69 and outputs a measurement result to the control unit 61. This temperature measurement result is used, for example, when the control unit 61 performs charge/discharge control at abnormal heat generation, when the control unit 61 performs correction processing at calculation of the remaining capacity, and the like. The voltage detection unit 66 measures a voltage of the solid battery in the power source 62, analog-to-digital converts a measured voltage, and supplies the converted voltage to the control unit 61.

The switch control unit 67 controls operation of the switch unit 63 according to signals input from the current measurement unit 64 and the voltage detection unit 66.

For example, when a battery voltage reaches an overcharge detection voltage, the switch control unit 67 performs control of disconnecting the switch unit 63 (charge control switch) so that a charging current does not flow in a current path of the power source 62. In this manner, in the power source 62, only discharge is possible via a discharge diode. Note that the switch control unit 67 is configured to shut off a charging current when, for example, a large current flows during charging.

Further, for example, when a battery voltage reaches an overdischarge detection voltage, the switch control unit 67 performs control of disconnecting the switch unit 63 (discharge control switch) so that a discharging current does not flow in a current path of the power source 62. In this manner, in the power source 62, only charging can be performed via the charging diode. Note that the switch control unit 67 is configured to shut off a discharging current when, for example, a large current flows during discharging.

Note that, in the solid battery, for example, the overcharge detection voltage is 4.2 V±0.05 V and the overdischarge detection voltage is 2.4 V±0.1 V.

The memory 68 is, for example, an EEPROM which is a nonvolatile memory or the like.

The memory 68 stores, for example, a numerical value calculated by the control unit 61, information (for example, internal resistance in an initial state) of the solid battery measured in a manufacturing process stage, and the like. Note that, if a full charge capacity of the solid battery is stored in the memory 68, the control unit 61 can grasp information, such as the remaining capacity.

The temperature detection element 69 measures a temperature of the power source 62 and outputs a measurement result to the control unit 61, and is, for example, a thermistor, or the like.

The positive electrode terminal 71 and the negative electrode terminal 72 are terminals connected to external equipment (for example, a notebook personal computer or the like) operated using a battery pack, external equipment (for example, a charger) used for charging the battery pack, and the like. Charging and discharging of the power source 62 are performed via the positive electrode terminal 71 and the negative electrode terminal 72.

6. Fifth Embodiment (Configuration Example of Vehicle)

A vehicle according to a fifth embodiment of the present invention is a vehicle including the solid battery according to the first embodiment of the present invention or the solid battery according to the third embodiment, a driving force conversion device that converts electric power supplied from the solid battery into a driving force, a driving unit that drives in accordance with a driving force, and a vehicle control device. The vehicle according to the fifth embodiment of the present invention includes the solid battery of the first embodiment or the solid battery of the third embodiment according to the present invention having excellent battery characteristics and excellent reliability, which leads to improvement in performance and reliability.

Hereinafter, the vehicle according to the fifth embodiment of the present invention will be described with reference to FIG. 8.

Figure 8:
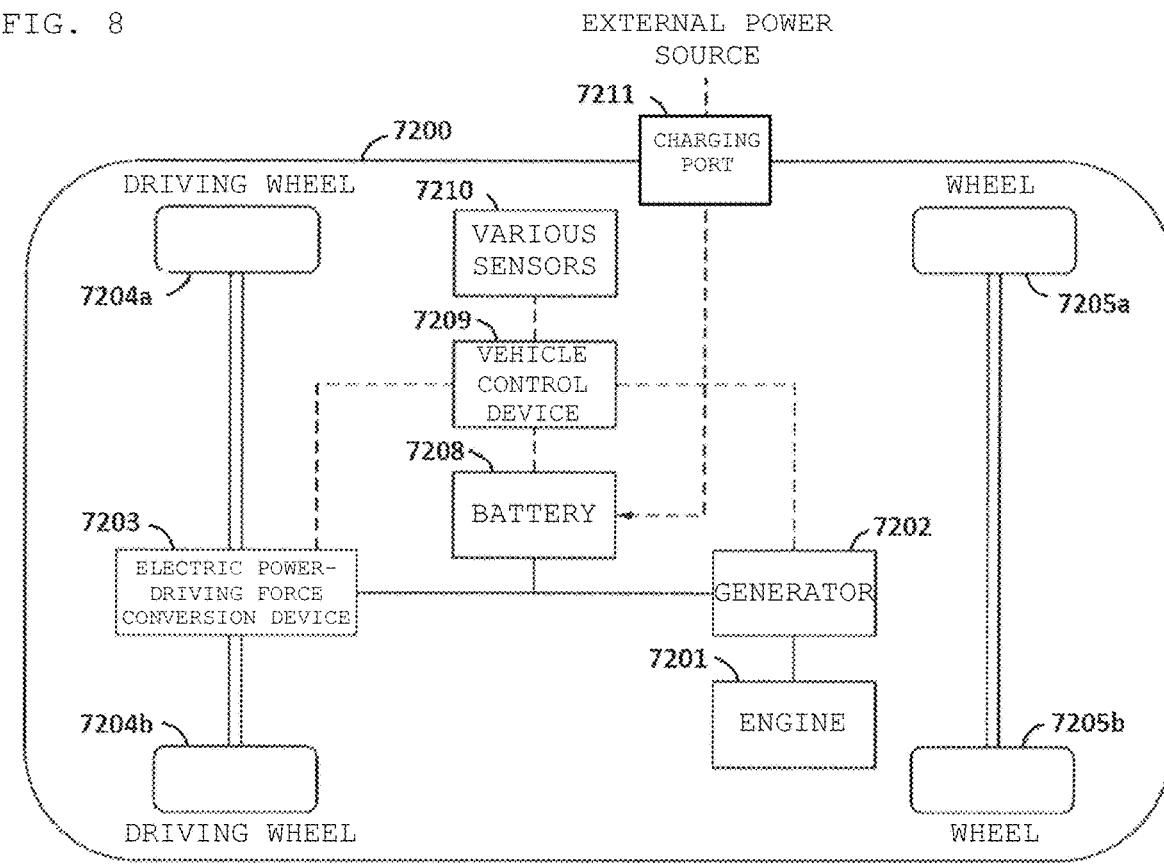
FIG. 8 is a perspective view showing a configuration example of a vehicle according to a fifth embodiment of the present invention.

FIG. 8 schematically shows an example of a configuration of a hybrid vehicle employing a series hybrid system to which the present invention is applied. The series hybrid system is a vehicle that runs on an electric power-driving force conversion device using electric power generated by a generator driven by an engine, or such electric power temporarily stored in a battery.

A hybrid vehicle 7200 is mounted with an engine 7201, a generator 7202, an electric power-driving force conversion device 7203, a driving wheel 7204a, a driving wheel 7204b, a wheel 7205a, a wheel 7205b, a battery 7208, a vehicle control device 7209, various sensors 7210, a charging port 7211. A power storage device (not shown) is applied to the battery 7208.

The hybrid vehicle 7200 runs by using the electric power-driving force conversion device 7203 as a power source. An example of the electric power-driving force conversion device 7203 is a motor. The electric power-driving force conversion device 7203 is operated by the electric power of the battery 7208, and a rotational force of the electric power-driving force conversion device 7203 is transmitted to the driving wheels 7204a, 7204b. It should be noted that by using DC-AC or AC-DC conversion in a required location, the electric power-driving force conversion device 7203 is applicable to either an AC motor or a DC motor. The various sensors 7210 control an engine speed via the vehicle control device 7209 and control an opening degree (throttle opening degree) of a throttle valve (not shown). The various sensors 7210 include a speed sensor, an acceleration sensor, an engine speed sensor, and the like.

The rotational force of the engine 7201 is transmitted to the generator 7202, and power generated by the generator 7202 using the rotational force can be accumulated in the battery 7208.

When the hybrid vehicle decelerates by a braking mechanism (not shown), a resistance force at the time of the deceleration is applied as a rotational force to the electric power-driving force conversion device 7203, and regenerative electric power generated by the electric power-driving force conversion device 7203 using the rotational force is accumulated in the battery 7208.

When connected to a power source outside the hybrid vehicle, the battery 7208 can also receive power supply from the external power source with a charging port 211 as an input port and store the received power.

Although not shown, the battery 7208 may include an information processing device that performs information processing relating to vehicle control based on information regarding a secondary battery. As such an information processing device, for example, there is an information processing device for displaying a remaining battery level based on information regarding a remaining amount of the battery.

Note that the above description exemplifies a series hybrid vehicle that runs with a motor using electric power generated by a generator driven by an engine, or such electric power temporarily stored in a battery. However, the present disclosure is also effectively applicable to a parallel hybrid vehicle that uses outputs of both an engine and a motor as drive sources, and uses three modes of running only by the engine, running only by the motor, and running by the engine and the motor, which are switched as appropriate. Furthermore, the present invention is effectively applicable to what is called an electric vehicle that runs only by a driving motor without using an engine.

7. Sixth Embodiment (Configuration Example of Power Storage System)

A power storage system according to a sixth embodiment of the present invention includes a power storage device including the solid battery according to the first embodiment of the present invention or the solid battery according to the third embodiment of the present invention, a power consumption device to which power from the solid battery is supplied, a control device for controlling power supply from the solid battery to the power consumption device, and a power generation device for charging the solid battery. The power storage system according to the sixth embodiment of the present invention includes the solid battery of the first embodiment according to the present invention having excellent battery characteristics and excellent reliability or the solid battery of the third embodiment according to the present invention, which leads to improvement in performance and reliability of power storage.

Figure 9:
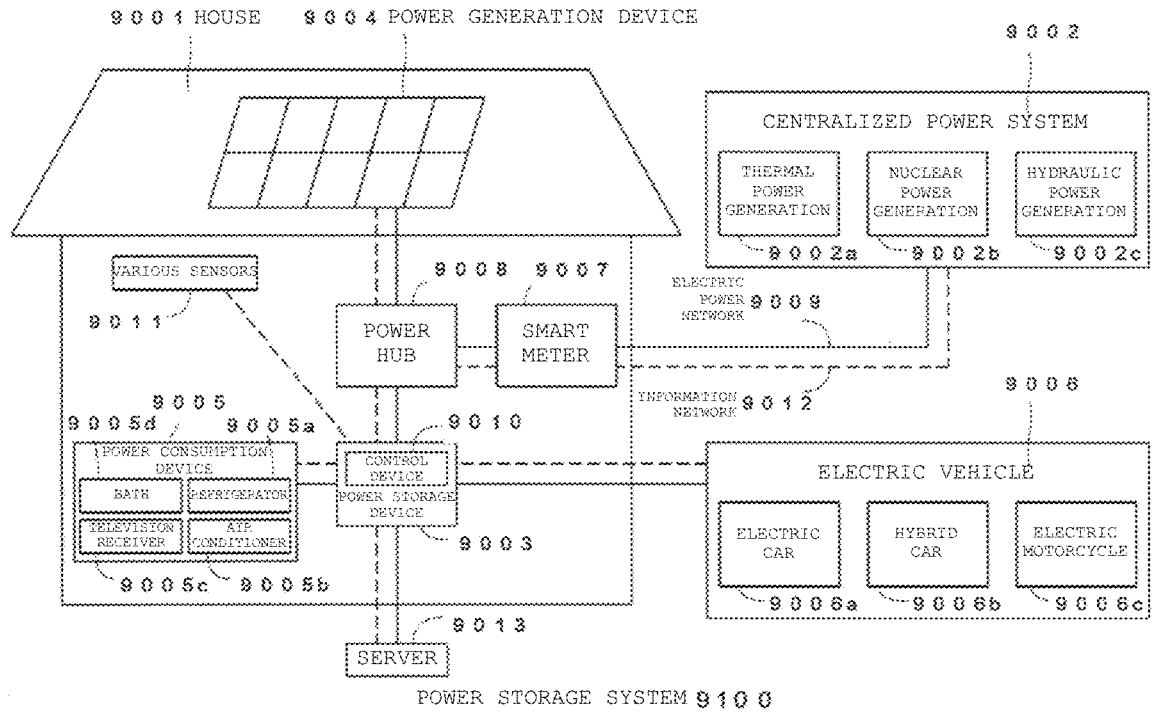
FIG. 9 is a perspective view showing a configuration example of a power storage system according to a sixth embodiment of the present invention.

Hereinafter, the power storage system for residential use which is an example of the power storage system according to the sixth embodiment of the present invention will be described with reference to FIG. 9.

For example, in a power storage system 9100 for a house 9001, electric power is supplied from a centralized power system 9002 of thermal power generation 9002a, nuclear power generation 9002b, hydraulic power generation 9002c, and the like to a power storage device 9003 through an electric power network 9009, an information network 9012, a smart meter 9007, a power hub 9008, and the like. At the same time, power is supplied from the independent power source such as a domestic power generation device 9004 or the like to the power storage device 9003. The power supplied to the power storage device 9003 is stored. Power to be used in the house 9001 is supplied using the power storage device 9003. A similar power storage system can be used not only for the house 9001 but also for a building.

The house 9001 is provided with the power generation device 9004, a power consumption device 9005, the power storage device 9003, a control device 9010 for controlling each device, a smart meter 9007, and a sensor 9011 for acquiring various kinds of information. Each device is connected by the electric power network 9009 and the information network 9012. A solar cell, a fuel cell, or the like is used as the power generation device 9004, and generated power is supplied to the power consumption device 9005 and/or the power storage device 9003. The power consumption device 9005 is a refrigerator 9005a, an air conditioner 9005b, a television receiver 9005c, a bath 9005d, and the like. Furthermore, the power consumption device 9005 includes an electric vehicle 9006. Electric vehicle 9006 is an electric car 9006a, a hybrid car 9006b, and an electric motorcycle 9006c.

The battery unit of the present disclosure described above is applied to the power storage device 9003. The power storage device 9003 is configured with a secondary battery or a capacitor.

The power storage device 9003 is configured with, for example, a lithium-ion battery. The lithium ion battery may be stationary or may be one used in the electric vehicle 9006. The smart meter 9007 has a function of measuring a usage amount of commercial power and sending the measured usage amount to the electric power company. The electric power network 9009 may perform any one or a combination of DC power feeding, AC power feeding, and contactless power feeding.

Various types of the sensors 9011 are, for example, a human sensor, an illuminance sensor, an object detection sensor, a power consumption sensor, a vibration sensor, a contact sensor, a temperature sensor, an infrared sensor, and the like. The information acquired by a various types of the sensors 9011 is transmitted to the control device 9010. According to the information from the sensors 9011, a state of weather, a state of a person, and the like are grasped, and the power consumption device 9005 is automatically controlled to minimize energy consumption. Furthermore, the control device 9010 can transmit information regarding the house 9001 to an external electric power company or the like via the Internet.

The power hub 9008 performs processing, such as branching of a power line and DC/AC conversion. Communication systems of the information network 9012 connected to the control device 9010 include a method of using a communication interface, such as universal asynchronous receiver-transmitter (UART), and a method of using a sensor network according to a wireless communication standard, such as Bluetooth (registered trademark), ZigBee, Wi-Fi, or the like. The Bluetooth (registered trademark) system is applied to multimedia communication and can perform one-to-many connection communication. ZigBee uses a physical layer of institute of electrical and electronics engineers (IEEE) 802.15.4. IEEE 802.15.4 is a name of short range wireless network standard called personal area network (PAN) or wireless (W) PAN.

The control device 9010 is connected to an external server 9013. The server 9013 may be managed by any of the house 9001, an electric power company, and a service provider. The information transmitted and received by the server 9013 is, for example, power consumption information, daily life pattern information, a power fee, weather information, natural disaster information, and information regarding an electricity transaction. These pieces of information may be transmitted to and received from a power consuming device (for example, a television receiver) in a home, but may be transmitted to and received from a device outside a home (for example, a mobile phone). These pieces of information may be displayed on equipment having a display function, for example, a television receiver, a mobile phone, a personal digital assistant (PDA), or the like.

The control device 9010 that controls each unit is configured with a central processing unit (CPU), a random access memory (RAM), a read only memory (ROM), and the like, and is stored in the power storage device 9003 in this example. The control device 9010 is connected to the power storage device 9003, the domestic power generation device 9004, the power consumption device 9005, the various sensors 9011, and the server 9013 by the information network 9012, and has, for example, a function of adjusting a usage amount of commercial power and a power generation amount. Note that the control device 9010 has a function for conducting an electricity transaction in an electric power market.

As described above, not only power of the centralized power system 9002 of the thermal power 9002*a*, the nuclear power 9002*b*, the hydraulic power 9002*c*, and the like, but also power generated by the domestic power generation device 9004 (solar power generation, wind power generation) can be stored in the power storage device 9003.

Therefore, even when the generated power of the domestic power generation device 9004 fluctuates, it is possible to perform control such that an amount of electric power sent to the outside is made constant, or power is discharged as necessary. For example, electric power obtained by photovoltaic power generation is stored in the power storage device 9003 and late-night power is stored in the power storage device 9003 during nighttime in which electricity charges are low, so that power stored in the power storage device 9003 can be discharged and used in a time zone during daytime in which electricity charges are high.

Note that, although the control device 9010 is described to be stored in the power storage device 9003 in this example, the control device 9010 may be stored in the smart meter 9007 or may be configured singly. Furthermore, the power storage system 9100 may be used for a plurality of homes in a multiple dwelling house, or may be used for a plurality of detached residences.

8. Seventh Embodiment (Configuration Example of Power Tool)

The power tool of the seventh embodiment according to the present invention is a power tool that includes the solid battery of the first embodiment according to the present invention or the solid battery of the third embodiment according to the present invention, and a movable unit to which electric power is supplied from the solid battery. The power tool according to the seventh embodiment of the present invention includes the solid battery of the first embodiment or the solid battery of the third embodiment according to the present invention having excellent battery characteristics and excellent reliability, which leads to improvement in performance of the power tool.

Hereinafter, the power tool according to the seventh embodiment of the present invention will be described with reference to FIG. 10.

Figure 10:
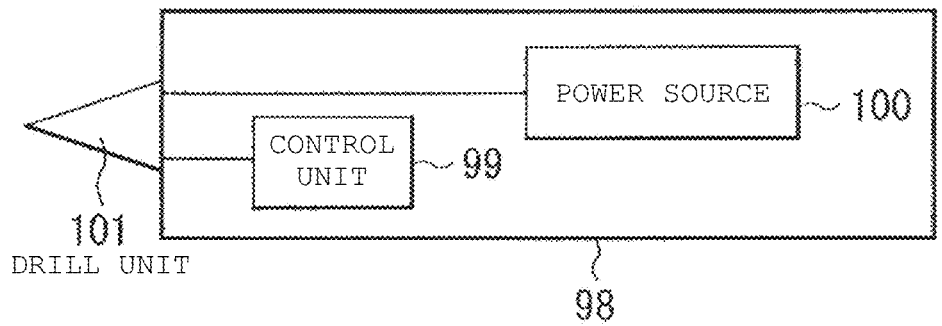
FIG. 10 is a block diagram showing a configuration example of a power tool according to a seventh embodiment of the present invention.

FIG. 10 shows a block configuration of the power tool. The electric power tool is, for example, an electric drill, and includes a control unit 99 and a power source 100 inside a tool main body 98 formed of a plastic material or the like. For example, a drill unit 101, which is a movable unit, is attached to the tool main body 98 in an operable (rotatable) manner.

The control unit 99 controls operation (including a use state of the power source 100) of the entire power tool, and includes, for example, a CPU and the like. The power source 100 includes one or two or more solid state batteries (not shown). The control unit 99 supplies electric power from the power source 100 to the drill unit 101 according to operation of an operation switch (not shown).

9. Eighth Embodiment (Configuration Example of Electronic Equipment)

The electronic equipment according to an eighth embodiment of the present invention includes the solid battery according to the first embodiment of the present invention or the solid battery according to the third embodiment of the present invention and receives supply of power from the solid battery. As described above, the electronic equipment according to the eighth embodiment of the present invention is equipment that exhibits various functions by using a solid battery as a power source (power supply source) for driving. The electronic equipment according to the eighth embodiment of the present invention includes the solid battery of the first embodiment according to the present invention having excellent battery characteristics and excellent reliability or the solid battery of the third embodiment according to the present invention, which leads to an improvement in the performance of the electronic equipment.

Figure 11:
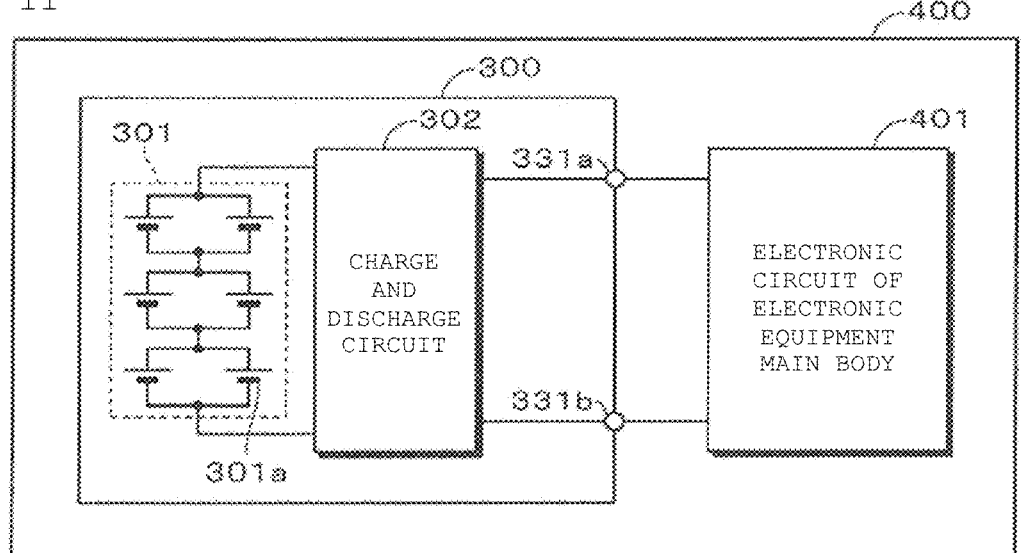
FIG. 11 is a block diagram showing a configuration example of electronic equipment according to an eighth embodiment of the present invention.

Hereinafter, the electronic equipment according to the eighth embodiment of the present invention will be described with reference to FIG. 11.

An example of a configuration of electronic equipment 400 according to the eighth embodiment of the present invention will be described. The electronic equipment 400 includes an electronic circuit 401 of the electronic equipment main body and a battery pack 300. The battery pack 300 is electrically connected to the electronic circuit 401 through a positive electrode terminal 331*a* and a negative electrode terminal 331*b*. The electronic equipment 400 has a configuration in which, for example, the battery pack 300 is freely attachable and detachable by the user. Note that the configuration of the electronic equipment 400 is not limited to the above, and the configuration may be such that the battery pack 300 is built in the electronic equipment 400 so that the battery pack 300 cannot be removed from the electronic equipment 400.

When the battery pack 300 is charged, the positive electrode terminal 331*a* and the negative electrode terminal 331*b* of the battery pack 300 are respectively connected to a positive electrode terminal and a negative electrode terminal of a charger (not shown). On the other hand, when the battery pack 300 is discharged (when the electronic equipment 400 is used), the positive electrode terminal 331*a* and the negative electrode terminal 331*b* of the battery pack 300 are respectively connected to a positive electrode terminal and a negative electrode terminal of the electronic circuit 401.

The electronic equipment 400 is, for example, a notebook computer, a tablet computer, a portable telephone (for example, a smartphone, or the like), a portable information terminal (Personal Digital Assistants: PDA), an imaging device (for example, a digital still camera, a digital video camera, or the like), audio equipment (for example, a portable audio player), a gaming machine, a cordless phone handset, an electronic book, an electronic dictionary, a radio, a headphone, a navigation system, a memory card, a pacemaker, a hearing aid, lighting equipment, a toy, medical equipment, a robot, or the like, and is not limited to these. As a specific example, a head mount type display and band type electronic equipment will be described. The head mount type display is electronic equipment that includes an image display device, a mounting device for mounting the image display device on the head of an observer, and an attaching member for attaching the image display device to the mounting device and uses the solid battery according to the first to third embodiments of the present invention. The band type electronic equipment is source electronic equipment that includes a plurality of segments connected in a band shape, a plurality of electronic components arranged in the plurality of segments, and a flexible circuit board connecting the plurality of electronic components in the plurality of segments and arranged in a serpentine shape in at least one segment, and, as the electronic component, the solid battery of the first to third embodiments according to the present invention is arranged in the segment.

The electronic circuit 401 includes, for example, a central processing unit (CPU), a peripheral logic unit, an interface unit, a storage unit, and the like, and controls the entire electronic equipment 400.

The battery pack 300 includes an assembled battery 301 and a charge and discharge circuit 302. The assembled battery 301 is configured by connecting a plurality of secondary batteries 301a in series and/or in parallel. The plurality of secondary batteries 301a are connected in, for example, n-parallel m-series (n, m are positive integers). Note that FIG. 6 shows an example in which six of the secondary batteries 301a are connected in two-parallel three-series (2P3S). As the secondary battery 301a, a secondary battery according to the first embodiment or a variation of the first embodiment is used.

At the time of charging, the charge and discharge circuit 302 controls charging of the assembled battery 301. On the other hand, at the time of discharging (that is, when the electronic equipment 400 is used), the charge and discharge circuit 302 controls discharge to the electronic equipment 400.

10. First Application Example: Printed Circuit Board

Figure 12:
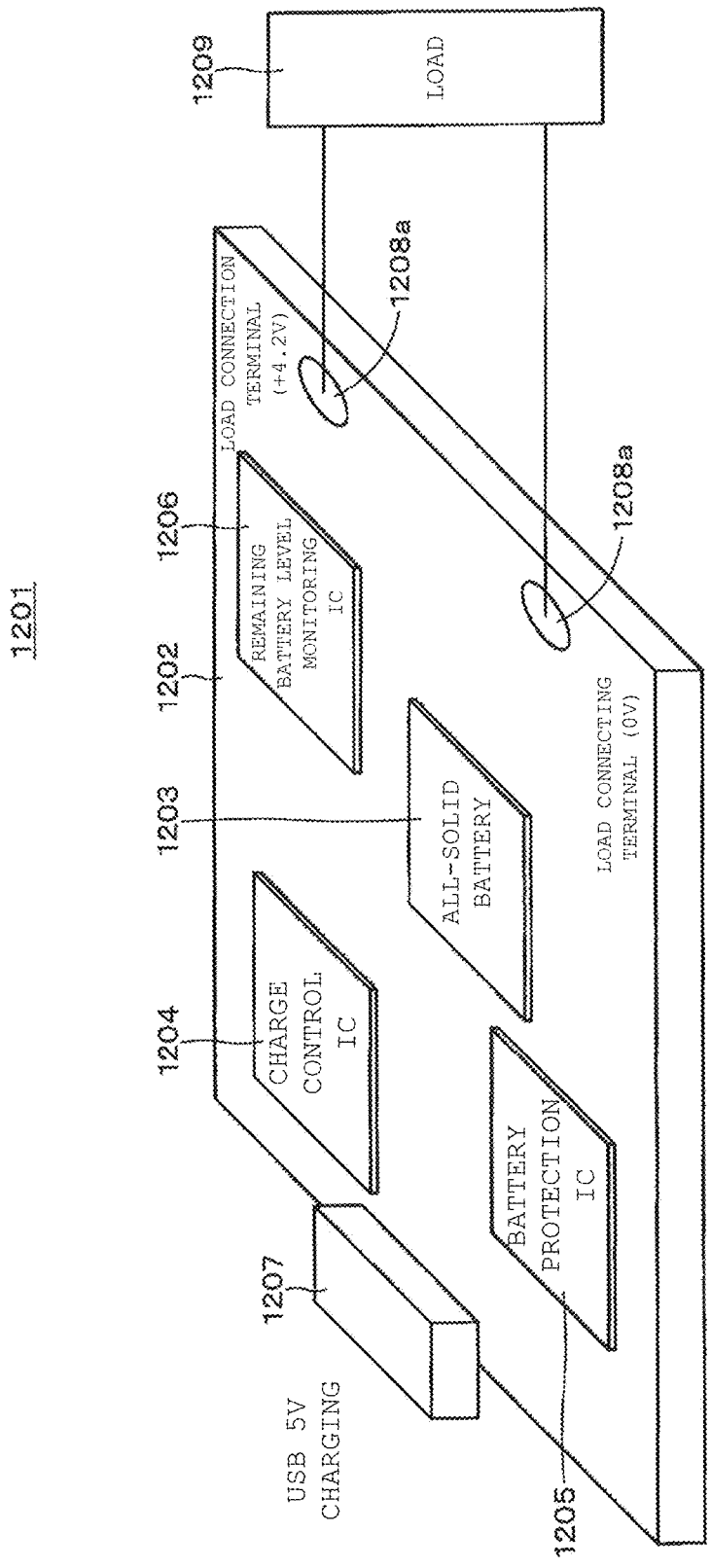
FIG. 12 is a diagram showing a configuration of a first application example (printed circuit board) of the solid battery according to the present invention.

The above-described solid battery can be mounted on a printed circuit board 1202 (hereinafter referred to as "PCB") together with a charging circuit and the like as shown in FIG. 12. For example, a solid battery 1203 and an electronic circuit, such as a charging circuit, can be mounted on the PCB 1202 in a reflow process. The PCB 1202 on which the solid battery 1203 and an electronic circuit, such as a charging circuit, are mounted is referred to as a battery module 1201. The battery module 1201 is configured as a card type as necessary, and can be configured as a portable card type mobile battery.

On the PCB 1202, a charge control integrated circuit (IC) 1204, a battery protection IC 1205, and a remaining battery level monitoring IC 1206 are also formed. The battery protection IC 1205 controls charge and discharge operation so that a charging voltage does not become excessive at the time of charging and discharging, an overcurrent does not flow due to a load short circuit, and overdischarge does not occur.

A universal serial bus (USB) interface 1207 is attached to the PCB 1202. The solid battery 1203 is charged with electric power supplied through the USB interface 1207. In this case, the charging operation is controlled by the charge control IC 1204. Furthermore, predetermined electric power (for example, at a voltage of 4.2 V) is supplied to a load 1209 from load connection terminals 1208a and 1208b attached to the PCB 1202. A remaining battery level of the solid battery 1203 is monitored by the remaining battery level monitoring IC 1206, and a display (not shown) showing the battery remaining level can be seen from the outside. Note that the USB interface 1207 may be used for load connection.

A specific example of the above-described load 1209 is as follows:

Wearable equipment (sports watch, clock, hearing aid, etc.);

IoT terminal (sensor network terminal, etc.);

Amusement equipment (portable game terminal, game controller);

IC board embedded battery (real time clock IC); and

Environmental power generation equipment (storage element for power generation elements, such as photovoltaic power generation, thermoelectric power generation, vibration power generation, and the like).

11. Second Application Example: Universal Credit Card

Currently, many people carry a plurality of credit cards. However, there is a problem that, as the number of credit cards increases, the risk of loss, theft, and the like increases. Therefore, a card called a universal credit card, in which functions of a plurality of credit cards, point cards, and the like are aggregated into one card, has been put to practical use. For example, information, such as numbers, expiration dates, and the like of various credit cards and point cards, can be taken into this card, so if one of such a card is put in a wallet or the like, a desired card can be selected and used at any time.

Figure 13:
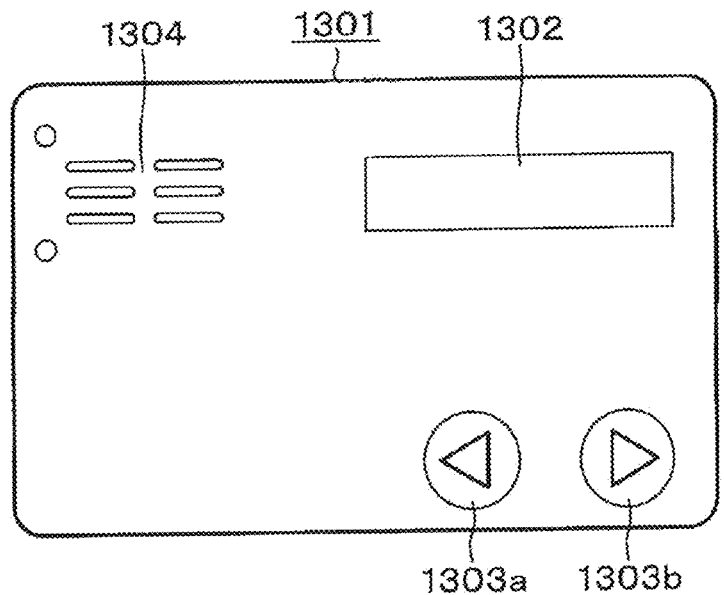
FIG. 13 is a diagram showing an example of a configuration of a second application example (universal credit card) of the solid battery according to the present invention.

FIG. 13 shows an example of a configuration of a universal credit card 1301. The universal credit card has a card shape, and incorporates an IC chip and a solid battery (not shown) according to the present invention. Furthermore, a display 1302 of low power consumption and operating units, such as direction keys 1303a and 1303b, are provided. Furthermore, a charging terminal 1304 is provided on a surface of the universal credit card 1301.

For example, the user can identify a credit card or the like loaded in the universal credit card 1301 in advance by operating the direction keys 1303a and 1303b while viewing the display 1302. When a plurality of credit cards are loaded in advance, information indicating each credit card is displayed on the display 1302, and the user can designate a desired credit card by operating the direction keys 1303a and 1303b. After that, the credit card can be used in a similar manner as a conventional credit card. It should be noted that the above is just an example, and it goes without saying that the solid battery according to the present invention can be applied to any electronic card other than the universal credit card 1301.

12. Third Application Example: Wristband Type Electronic Equipment

An example of a wearable terminal is wristband type electronic equipment. Among such equipment, a wristband type activity meter, also called a smart band, can acquire data relating to human activity, such as step count, moving distance, calorie consumption, sleep amount, heart rate, only by being wound around an arm. Furthermore, the acquired data can be managed by a smartphone. Furthermore, the wristband type activity meter can be provided with an email sending and receiving function, and, for example, one having a notifying function of notifying the user of incoming email by a light emitting diode (LED) lamp and/or vibration is used.

Figure 14:
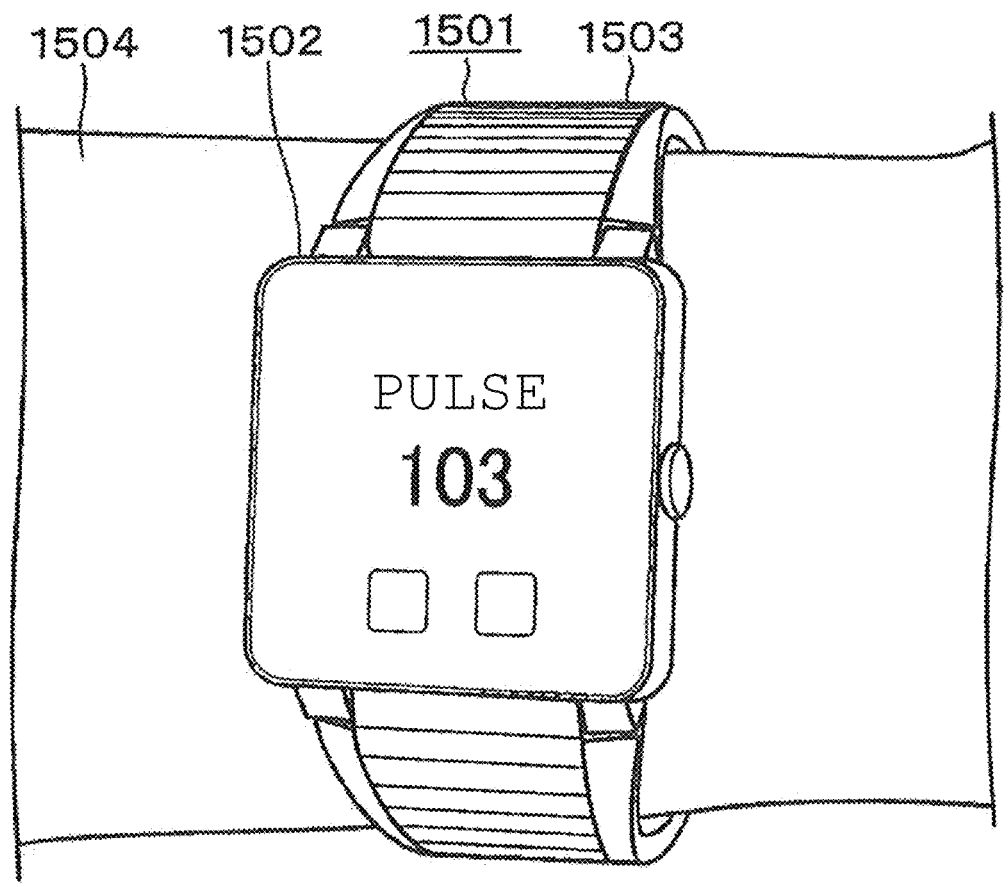
FIG. 14 is a diagram showing an example of a configuration of a third application example (wristband type activity meter) of the solid battery according to the present invention.
Figure 15:
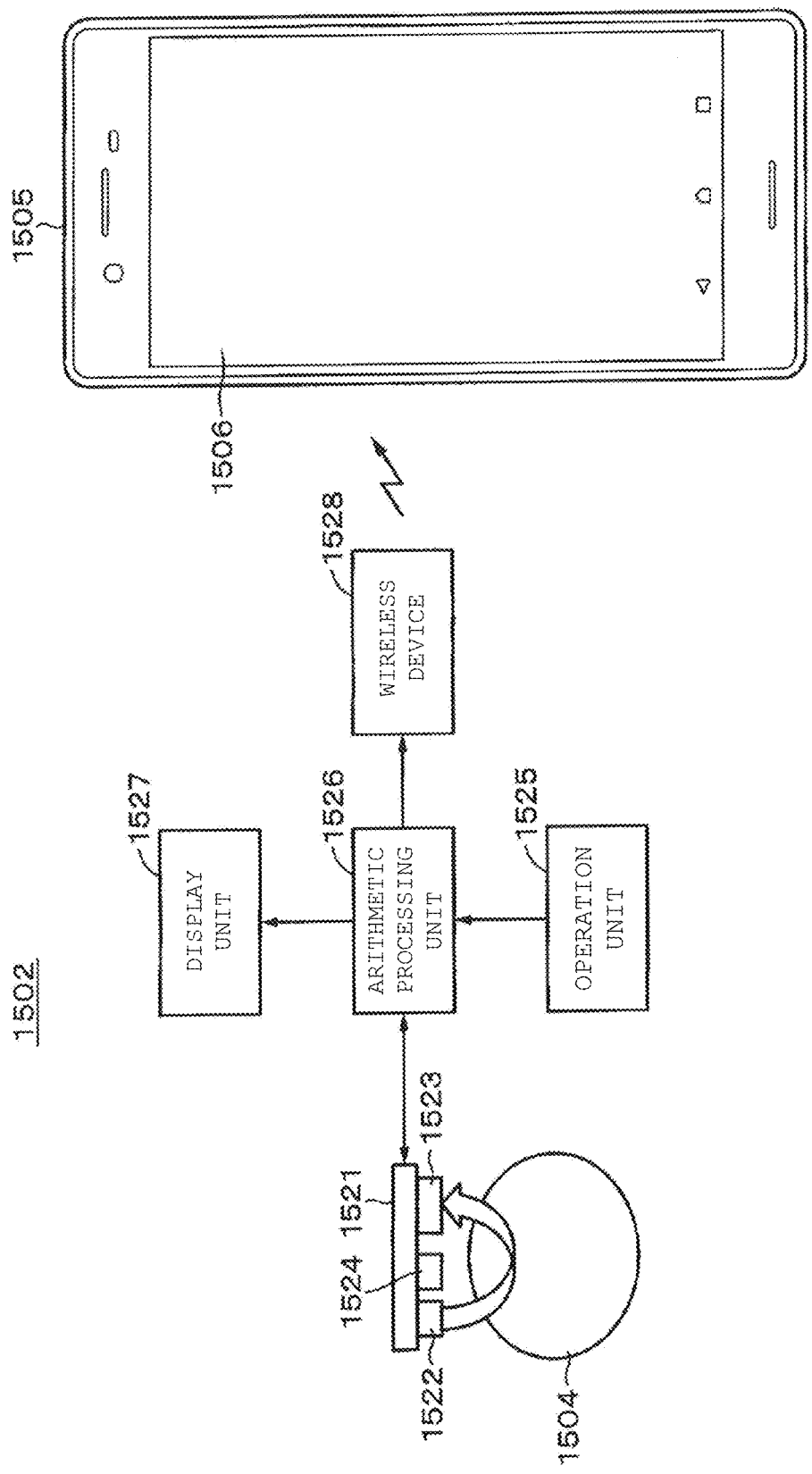
FIG. 15 is a diagram showing an example of a configuration of the third application example (wristband type activity meter) of the solid battery according to the present invention.

FIGS. 14 and 15 show an example of a wristband type activity meter that measures, for example, a pulse. FIG. 14 shows a configuration example of an appearance of a wristband type activity meter 1501. FIG. 15 shows a configuration example of a main body 1502 of the wristband type activity meter 1501.

The wristband type activity meter 1501 is a wristband type measuring device for measuring, for example, a pulse of a subject by an optical method. As shown in FIG. 14, the wristband type activity meter 1501 is configured with the main body 1502 and a band 1503, and the band 1503 is attached to an arm (wrist) 1504 of the subject, like a wristwatch. Then, the main body 1502 irradiates a portion including a pulse of the arm 1504 of the subject with measurement light of a predetermined wavelength, and measures the pulse of the subject based on intensity of returned light.

The main body 1502 is configured to include a substrate 1521, an LED 1522, a light receiving IC 1523, a light shield 1524, an operation unit 1525, an arithmetic processing unit 1526, a display unit 1527, and a wireless device 1528. The LED 1522, the light receiving IC 1523, and the light shield 1524 are provided on the substrate 1521. Under the control of the light receiving IC 1523, the LED 1522 irradiates a portion including a pulse of the arm 1504 of the subject with measurement light of a predetermined wavelength.

The light receiving IC 1523 receives light that returns after the arm 1504 is irradiated with the measurement light. The light receiving IC 1523 generates a digital measurement signal indicating the intensity of returned light and supplies the generated measurement signal to the arithmetic processing unit 1526.

The light shield 1524 is provided between the LED 1522 and the light receiving IC 1523 on the substrate 1521. The light shield 1524 prevents measurement light from the LED 1522 from directly entering the light receiving IC 1523.

The operation unit 1525 is configured with various operation members, such as, for example, buttons and switches, and is provided on a surface of the main body 1502 or the like. The operation unit 1525 is used for operating the wristband type activity meter 1501 and supplies a signal indicating the operation content to the arithmetic processing unit 1526.

The arithmetic processing unit 1526 performs arithmetic processing for measuring a pulse of the subject based on the measurement signal supplied from the light receiving IC 1523. The arithmetic processing unit 1526 supplies the measurement result of the pulse to the display unit 1527 and the wireless device 1528.

The display unit 1527 is configured with, for example, a display device, such as a liquid crystal display (LCD) and is provided on a surface of the main body 1502. The display unit 1527 displays the measurement result of the pulse of the subject and the like.

The wireless device 1528 transmits the measurement result of the pulse of the subject to an external device by wireless communication of a predetermined scheme. For example, as shown in FIG. 15, the wireless device 1528 transmits the measurement result of the pulse of the subject to a smartphone 1505, and displays the measurement result on a screen 1506 of the smartphone 1505. Furthermore, data of the measurement result is managed by the smartphone 1505, and the measurement result can be viewed by the smartphone 1505 or can be stored in a server on a network.

Note that an optional system can be employed as a communication system of the wireless device 1528. Note that the light receiving IC 1523 can also be used to measure a pulse at a portion (for example, a finger, an earlobe, or the like) other than the arm 1504 of the subject.

The above-described wristband type activity meter 1501 can accurately measure a pulse wave and a pulse of the subject by removing the influence of a body movement by signal processing in the light receiving IC 1523. For example, even if the subject performs vigorous exercise, such as running, it is possible to accurately measure a pulse wave and a pulse of the subject. Further, for example, even in a case where the subject wears the wristband type activity meter 1501 for a long time to perform measurement, a pulse wave and a pulse can be measured accurately by removing the influence of a body movement of the subject.

Further, by reducing an amount of calculation, power consumption of the wristband type activity meter 1501 can be reduced. As a result, it becomes possible to perform the measurement by attaching the wristband type activity meter 1501 to the subject for a long time without, for example, charging or replacing the battery.

Note that, as a power source, for example, a thin battery is stored in the band 1503. The wristband type activity meter 1501 includes an electronic circuit of a main body and a battery pack. For example, the battery pack is configured to be detachable by the user. The electronic circuit is a circuit included in the above-described main body 1502. The present invention can be applied when an all-solid battery is used as a battery.

Figure 16:
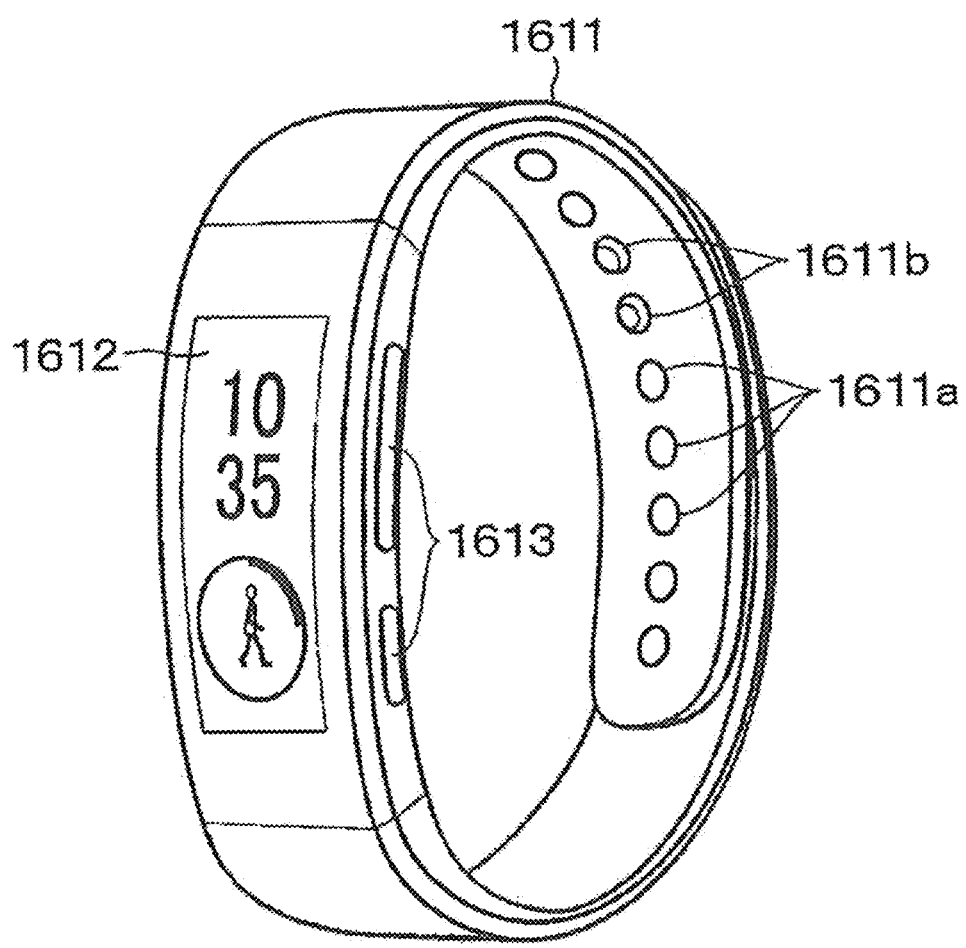
FIG. 16 is a diagram showing a configuration of the third application example (wristband type electronic equipment) of the solid battery according to the present invention.

FIG. 16 shows a configuration example of an appearance of wristband type electronic equipment 1601 (hereinafter simply referred to as "electronic equipment 1601").

The electronic equipment 1601 is, for example, what is called a wearable device which is a clock type detachably attached to a human body. The electronic equipment 1601 includes, for example, a band portion 1611 attached to an arm, a display device 1612 for displaying numerals, characters, symbols, and the like, and an operation button 1613. On the band portion 1611, a plurality of holes 1611a and a protrusion 1611b formed on an inner peripheral surface (a surface in contact with an arm when the electronic equipment 1601 is mounted) side.

In a use state, the electronic equipment 1601 is bent so that the band portion 1611 has a substantial circular shape as shown in FIG. 16, and has the protrusion 1611b inserted into the hole 1611a so as to be attached to an arm. By adjusting a position of the hole 1611a into which the protrusion 1611b is inserted, degree of a diameter can be adjusted in accordance with a thickness of an arm. When the electronic equipment 1601 is not in use, the protrusion 1611b is removed from the hole 1611a, and the band portion 1611 is stored in a substantially flat state. A sensor according to an embodiment of the present invention is provided over, for example, the entire band portion 1611.

13. Fourth Application Example: Smart Watch

A smart watch has an appearance like or similar to a design of an existing watch and is used by being attached to an arm of the user like a wrist watch, and has a function of notifying the user of various messages of an incoming call, received email, and the like through information shown on a display. Furthermore, a smart watch having functions, such as an electronic money function, an activity meter, and the like has been proposed. The smart watch has a display incorporated on a surface of a main body portion of electronic equipment, and various pieces of information are shown on the display. Further, the smart watch can cooperate with a function, content, and the like of a communication terminal and the like by, for example, performing short-distance wireless communication, such as Bluetooth (registered trademark), with a communication terminal (smart phone or the like).

As one of the smart watches, one that includes a plurality of segments connected in a band shape, a plurality of electronic components arranged in the plurality of segments, and a flexible circuit board that connects the plurality of electronic components in the plurality of segments and is arranged in a serpentine shape in at least one segment has been proposed. By having such a serpentine shape, stress is not applied to the flexible circuit board even if the band is bent, and disconnection of the circuit is prevented. Further, an electronic circuit component can be built in a segment on the band side attached to the watch main body, instead of a housing constituting the watch main body, and there is no need to change the watch main body side. Accordingly, it is possible to configure a smart watch of a design similar to that of a conventional watch. Further, the smart watch of the present application example can perform notification of email and an incoming call, recording of a log, such as an activity history of the user, calling, and the like. Further, the smart watch includes a function as a non-contact type IC card, and can perform settlement, authentication, and the like in a non-contact manner.

The smart watch of the present application example incorporates a circuit component for performing communication processing and notification processing in a metallic band. In order for the smart watch to function as electronic equipment while reducing a thickness of the metallic band, the band has a configuration in which a plurality of segments are connected, and a circuit board, a vibration motor, a battery, and an acceleration sensor are stored in each segment. Components, such as a circuit board, a vibration motor, a battery, an acceleration sensors, and the like, of each segment are connected by a flexible printed circuit board (FPC).

Figure 17:
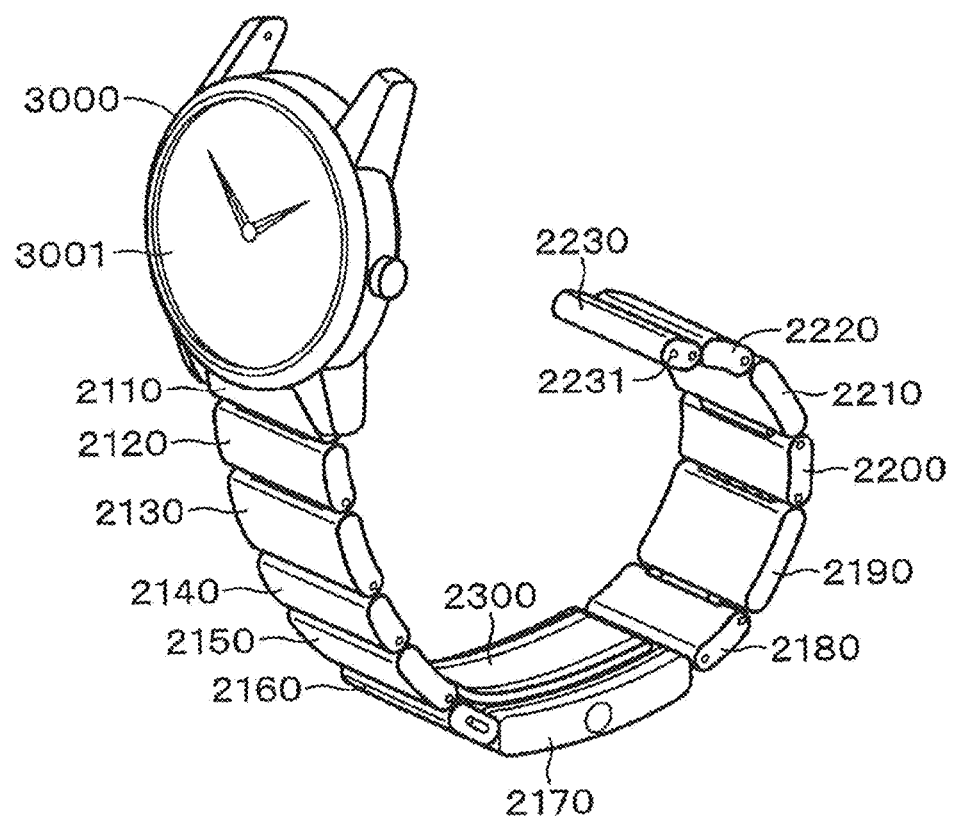
FIG. 17 is an exploded perspective view showing a configuration of a fourth application example (smart watch) of the solid battery according to the present invention.

FIG. 17 shows an entire configuration (exploded perspective view) of the smart watch. Band type electronic equipment 2000 is a metal band attached to a watch main body 3000 and is attached to an arm of the user. The watch main body 3000 includes a dial 3100 for displaying a time. Instead of the dial 3100, the watch main body 3000 may electronically display a time on a liquid crystal display or the like.

The band type electronic equipment 2000 has a configuration in which a plurality of segments 2110 to 2230 are connected. The segment 2110 is attached to one band attachment hole of the watch main body 3000 and the segment 2230 is attached to the other band attachment hole of the watch main body 3000. In this example, each of the segments 2110-2230 is made from metal.

(Outline of the Inside of the Segment)

Figure 18:
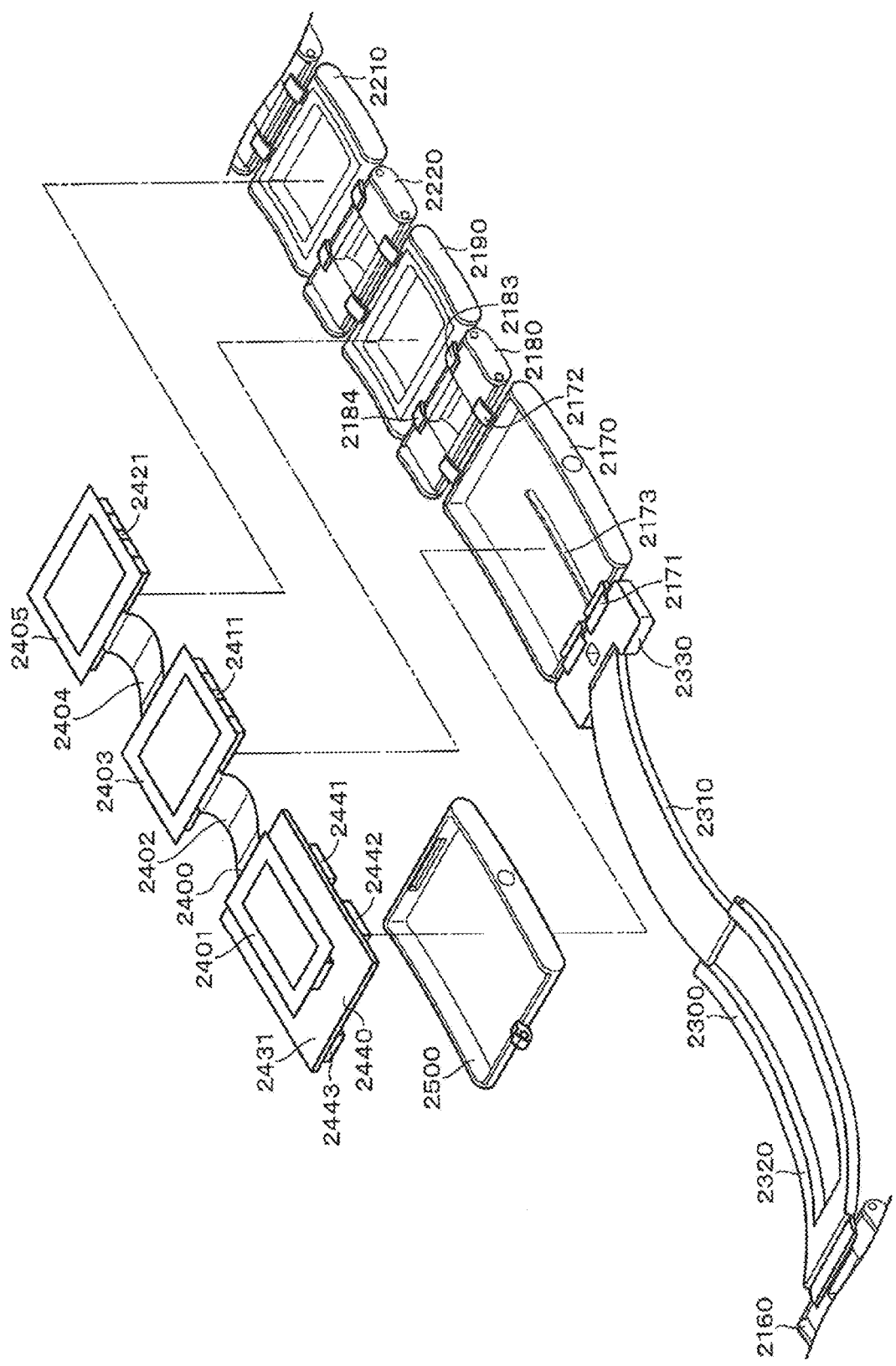
FIG. 18 is a diagram showing part of an internal configuration of the fourth application example (band type electronic equipment) of the solid battery according to the present invention.

FIG. 18 shows part of an internal configuration of the band type electronic equipment 2000. For example, the insides of three segments 2170, 2180, 2190, 2200, and 2210 are shown. In the band type electronic equipment 2000, a flexible circuit board 2400 is arranged in the inside of five of the consecutive segments 2170 to 2210. Various electronic components are arranged in the segment 2170, and batteries 2411 and 2421 according to the present invention are arranged in the segments 2190 and 2210, and these components are electrically connected by the flexible circuit board 2400. The segment 2180 between the segment 2170 and the segment 2190 is of a comparatively small size and a serpentine flexible circuit board 2400 is disposed in the segment 2180. In the inside of the segment 2180, the flexible circuit board 2400 is disposed in a state sandwiched between waterproof members. Note that the inside of the segments 2170 to 2210 has a waterproof structure.

(Circuit Configuration of Smart Watch)

Figure 19:
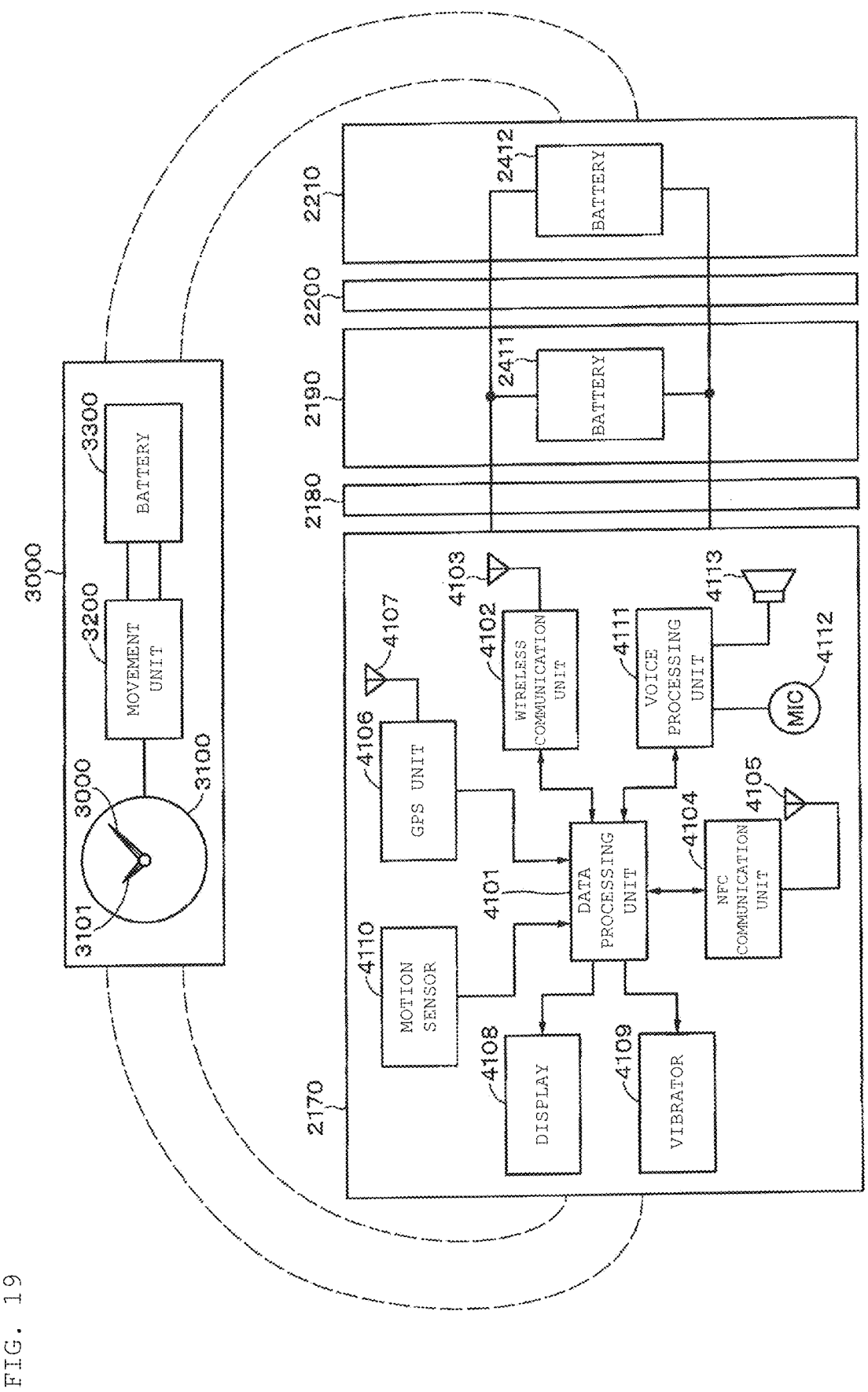
FIG. 19 is a block diagram showing a circuit configuration of the fourth application example (band type electronic equipment) of the solid battery according to the present invention.

FIG. 19 is a block diagram showing a circuit configuration of the band type electronic equipment 2000. A circuit in the inside of the band type electronic equipment 2000 has a configuration independent of the watch main body 3000. The watch main body 3000 includes a movement unit 3200 that rotates a needle disposed on the dial 3100. A battery 3300 is connected to the movement unit 3200. The movement unit 3200 and the battery 3300 are incorporated in a housing of the watch main body 3000.

In the band type electronic equipment 2000 connected to the watch main body 3000, electronic components are arranged in three of the segments 2170, 2190, and 2210. In the segment 2170, a data processing unit 4101, a wireless communication unit 4102, an NFC communication unit 4104, and a GPS unit 4106 are arranged. Antennas 4103, 4105, and 4107 are connected to the wireless communication unit 4102, the NFC communication unit 4104, and the GPS unit 4106, respectively. The antennas 4103, 4105, 4107 are arranged in the vicinity of a slit 2173, which will be described later, of the segment 2170.

The wireless communication unit 4102 performs short-distance wireless communication with other terminals according to, for example, the Bluetooth (registered trademark) standard. The NFC communication unit 4104 performs wireless communication with an adjacent reader/writer under the NFC standard. The GPS unit 4106 is a positioning unit that receives a radio wave from a satellite of a system called a global positioning system (GPS) and performs positioning of a current position. Data obtained by the wireless communication unit 4102, the NFC communication unit 4104, and the GPS unit 4106 is supplied to the data processing unit 4101.

Further, in the segment 2170, a display 4108, a vibrator 4109, a motion sensor 4110, and a voice processing unit 4111 are arranged. The display 4108 and the vibrator 4109 function as a notification unit for performing notification to a wearer of the band type electronic equipment 2000. The display 4108 is configured with a plurality of light emitting diodes, and performs notification to the user by turning on or blinking the light emitting diodes. The plurality of light emitting diodes are disposed, for example, inside the slit 2173, which will be described later, of the segment 2170, and give notification of an incoming telephone call, receiving of email, and the like by turning on or blinking. As the display 4108, a type that displays characters, numbers, and the like may be used. The vibrator 4109 is a member that vibrates the segment 2170. The band type electronic equipment 2000 gives notification of an incoming telephone call, receiving of email, and the like by the vibrator 4109 vibrating the segment 2170.

The motion sensor 4110 detects a movement of the user who wears the band type electronic equipment 2000. As the motion sensor 4110, an acceleration sensor, a gyro sensor, an electronic compass, an atmospheric pressure sensor, or the like is used. Further, the segment 2170 may incorporate a sensor other than the motion sensor 4110. For example, a biosensor for detecting a pulse or the like of the user wearing the band type electronic equipment 2000 may be incorporated. A microphone 4112 and a speaker 4113 are connected to the voice processing unit 4111, and the voice processing unit 4111 performs calling processing with a party connected by wireless communication by the wireless communication unit 4102. Further, the voice processing unit 4111 can also perform processing for voice input operation.

Then, the battery 2411 is incorporated in the segment 2190, and the battery 2421 is incorporated in the segment 2210. The batteries 2411 and 2421 can be configured with the solid battery according to the present invention, and supply power for driving to circuits in the segment 2170. The circuit in the segment 2170 and the batteries 2411 and 2421 are connected by the flexible circuit board 2400 (FIG. 18). Note that, although not shown in FIG. 19, the segment 2170 includes terminals for charging the batteries 2411 and 2421. Further, electronic components other than the batteries 2411 and 2421 may be arranged in the segments 2190 and 2210. For example, the segments 2190 and 2210 may include a circuit for controlling charging and discharging of the batteries 2411 and 2421.

14. Fifth Application Example: Eyeglasses-Type Terminal

In an eyeglass-type terminal described below, information, such as text, symbols, images, and the like, can be superimposed and displayed on a landscape in front of the eyes. That is, the eyeglass-type terminal is mounted with a lightweight and thin image display device display module dedicated to a transmissive eyeglasses type terminal. Typically, there is a head mounted display (HMD).

This image display device includes an optical engine and a hologram light guide plate. The optical engine emits image light of an image, text, and the like by using a micro display lens. This image light enters the hologram light guide plate. The hologram light guide plate is one in which hologram optical elements are incorporated at both end portions of a transparent plate, and the image light from the optical engine propagates through a very thin transparent plate having a thickness, such as 1 mm, to reach eyes of an observer. With such a configuration, a lens having a thickness of 3 mm (including a protective plate around the light guide plate) having a transmittance of, for example, 85% is obtained. With such an eyeglasses-type terminal, it is possible to view results of players and teams in real time during sports watching, or to display the tour guide at a travel destination.

Figure 20:
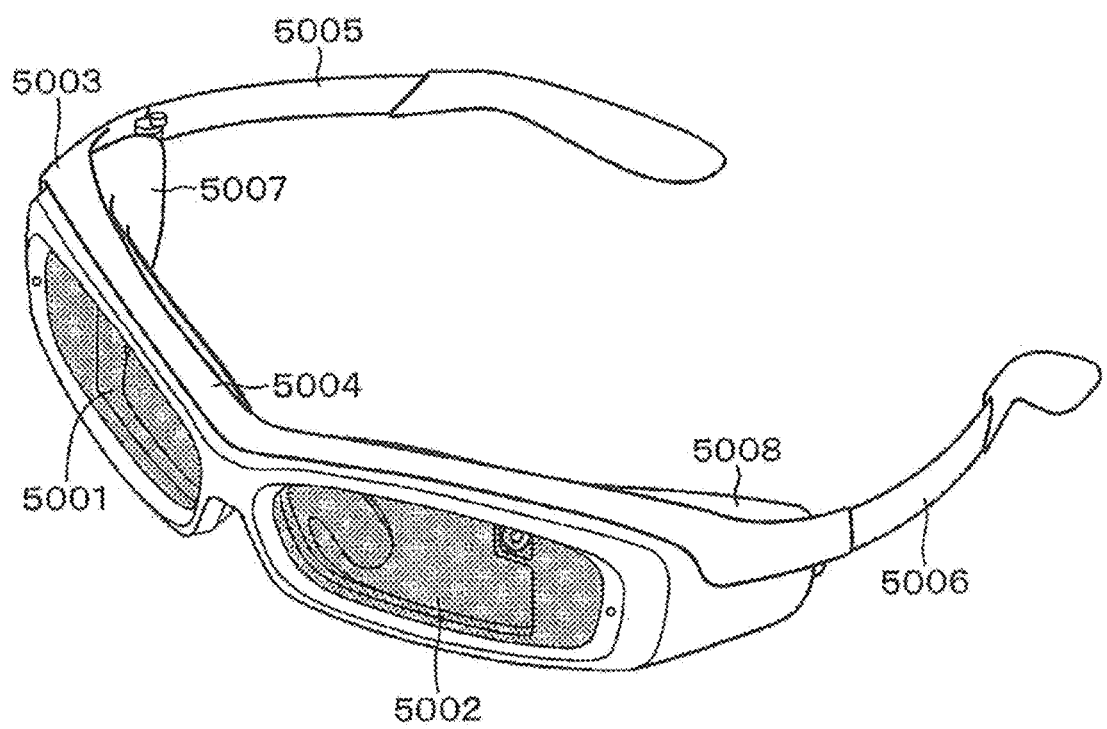
FIG. 20 is a diagram showing a specific example of a configuration of a fifth application example (eyeglasses-type terminal) of the solid battery according to the present invention.

In a specific example of the eyeglass-type terminal, as shown in FIG. 20, an image display unit has an eyeglasses-type configuration. That is, like usual eyeglasses, a frame 5003 for holding a right image display portion 5001 and a left image display portion 5002 is provided in front of eyes. The frame 5003 is composed of a front portion 5004 disposed on the front of an observer and two temple portions 5005, 5006 pivotally attached to both ends of the front portion 5004 via hinges. The frame 5003 is made from the same material as the material constituting ordinary eyeglasses, such as metal, an alloy, plastic, or a combination of these. Note that a headphone unit may be provided.

The right image display portion 5001 and the left image display portion 5002 are arranged so as to be positioned in front of a right eye and a left eye of the user, respectively. The temple portions 5005 and 5006 hold the image display portions 5001 and 5002 on the head of the user. A right display driving unit 5007 is disposed on an inner side of the temple portion 5005 at a connection portion between the front portion 5004 and the temple portion 5005. A left display driving unit 5008 is disposed on an inner side of the temple portion 5006 at a connection portion between the front portion 5004 and the temple portion 5006.

Although not shown in FIG. 20, the solid battery according to the present invention, an acceleration sensor, a gyro sensor, an electronic compass, a microphone/speaker, and the like are mounted on the frame 5003. Furthermore, an imaging device is attached, and shooting of still images/moving images is enabled. Furthermore, a controller connected to an eyeglass part by, for example, a wireless or wired interface is included. The controller is provided with a touch sensor, various buttons, a speaker, a microphone, and the like.

Furthermore, a linkage function with a smartphone is also included. For example, a GPS function of a smartphone can be utilized to provide information according to a situation of the user.

The present invention is not limited to the above-described embodiments and application examples, and can be modified within a range not deviating from the gist of the present invention.

Note that, the effect of the present invention can be obtained without depending on a type of an electrode reactant as long as the electrode reactant is used for a solid battery. Accordingly, even if the type of the electrode reactant is changed, a similar effect can be obtained. Further, the chemical formulas of compounds and the like are representative and are not limited to the described valences and the like as long as common names of the same compounds are used.

DESCRIPTION OF REFERENCE SYMBOLS 10, 50, 51: All-solid battery
11, 12: Outer layer
13: First laminate body
14: Second laminate body
15: Third laminate body
16: Fourth laminate body
17: Fifth laminate body
101: First electrolyte layer
102: First positive electrode layer
103: First current collecting layer
104: Second positive electrode layer
105: Second electrolyte layer
106: First negative electrode layer
107: Second current collecting layer
108: Second negative electrode layer
109, 109a, 109b: First insulating layer
110: Second insulating layer

The invention claimed is:

1. A solid battery, comprising:
at least one first laminate body in which a first electrolyte layer, a first positive electrode layer, a first current collecting layer, and a second positive electrode layer are laminated in this order;
at least one second laminate body in which a second electrolyte layer, a first negative electrode layer, a second current collecting layer, and a second negative electrode layer are laminated in this order;
a first insulating layer connected to at least part of a side surface portion of the at least one first laminate body; and
a second insulating layer connected to at least part of a side surface portion of the at least one second laminate body, wherein
the first laminate body and the second laminate body are laminated together along a main plane of the first electrolyte layer where the first positive electrode layer is not laminated thereto and a main plane of the second negative electrode layer where the second current collecting layer is not laminated thereto, or along a main plane of the second electrolyte layer where the first negative electrode layer is not laminated thereto and a main plane of the second positive electrode layer where the first current collecting layer is not laminated thereto, each of the first current collecting layer and the second current collecting layer has ionic conductivity, said ionic conductivity being $10^{-7}$ S/cm or lower, and each of the first insulating layer and the second insulating layer has ionic conductivity, said ionic conductivity being $10^{-7}$ S/cm or lower.

2. The solid battery according to claim 1, wherein each of the first insulating layer and the second insulating layer has ionic conductivity of $10^{-8}$ S/cm or lower.

3. The solid battery according to claim 1, further comprising:
a first outer layer; and
a second outer layer, wherein
the first outer layer is on an uppermost part of the solid battery, and
the second outer layer is on a lowermost part of the solid battery.

4. A battery pack, comprising:
the solid battery according to claim 1;
a control unit that controls a use state of the solid battery; and
a switch unit that switches the use state of the solid battery according to an instruction of the control unit.

5. A vehicle, comprising:
the solid battery according to claim 1;
a driving force conversion device for receiving supply of electric power from the solid battery and converting the electric power into a driving force of a vehicle;
a driving unit for driving in accordance with the driving force; and
a vehicle control device for controlling the driving force.

6. A power storage system, comprising:
a power storage device including the solid battery according to claim 1;
a power consumption device to which power from the solid battery is supplied;
a control device for controlling the supply of the power from the solid battery to the power consumption device; and
a power generation device for charging the solid battery.

7. A power tool, comprising:
the solid battery according to claim 1; and
a movable portion to which electric power is supplied from the solid battery.

8. Electronic equipment comprising:
the solid battery according to claim 1, wherein
the electronic equipment receives supply of electric power from the solid battery.

9. A solid battery, comprising:
at least one first laminate body in which a first electrolyte layer, a first positive electrode layer, a first current collecting layer, and a second positive electrode layer are laminated in this order;
at least one third laminate body in which a third electrolyte layer and a third negative electrode layer are laminated;
a first insulating layer connected to at least part of a side surface portion of the at least one first laminate body; and a third insulating layer connected to at least part of a side surface portion of the at least one third laminate body, wherein the first laminate body and the third laminate body are laminated together along a main plane of the first electrolyte layer where the first positive electrode layer is not laminated thereto and a main plane of the third negative electrode layer where the third electrolyte layer is not laminated thereto, or along a main plane of the third electrolyte layer where the third negative electrode layer is not laminated thereto and a main plane of the second positive electrode layer where the first current collecting layer is not laminated thereto, the first current collecting layer has ionic conductivity, said ionic conductivity being $10^{-7}$ S/cm or lower, and each of the first insulating layer and the third insulating layer has ionic conductivity, said ionic conductivity being $10^{-7}$ S/cm or lower.

10. The solid battery according to claim 9, wherein each of the first insulating layer and the third insulating layer has ionic conductivity of $10^{-8}$ S/cm or lower.

11. The solid battery according to claim 9, further comprising:
a first outer layer; and
a second outer layer, wherein
the first outer layer is on an uppermost part of the solid battery, and
the second outer layer is on a lowermost part of the solid battery.

12. A battery pack, comprising:
the solid battery according to claim 9;
a control unit that controls a use state of the solid battery; and
a switch unit that switches the use state of the solid battery according to an instruction of the control unit.

13. A vehicle, comprising:
the solid battery according to claim 9;
a driving force conversion device for receiving supply of electric power from the solid battery and converting the electric power into a driving force of a vehicle;
a driving unit for driving in accordance with the driving force; and
a vehicle control device for controlling the driving force.

14. A power storage system, comprising:
a power storage device including the solid battery according to claim 9;
a power consumption device to which power from the solid battery is supplied;
a control device for controlling the supply of the power from the solid battery to the power consumption device; and
a power generation device for charging the solid battery.

15. A power tool, comprising:
the solid battery according to claim 9; and
a movable portion to which electric power is supplied from the solid battery.

16. Electronic equipment comprising:
the solid battery according to claim 9, wherein
the electronic equipment receives supply of electric power from the solid battery.

17. A manufacturing method for a solid battery, the manufacturing method comprising:
applying a first electrolyte layer to a first release film;
laminating a first positive electrode layer, a first current collecting layer, and a second positive electrode layer on the first electrolyte layer in this order to obtain a first laminate body;

connecting a first insulating layer to at least part of a side surface portion of the first laminate body;

applying a second electrolyte layer to a second release film;

laminating a first negative electrode layer, a second current collecting layer, and a second negative electrode layer on the second electrolyte layer in this order to obtain a second laminate body;

connecting a second insulating layer to at least part of a side surface portion of the second laminate body;

releasing the first release film from the first laminate body;

releasing the second release film from the second laminate body; and laminating the first laminate body and the second laminate body along a main plane of the first electrolyte layer where the first positive electrode layer is not laminated thereto and a main plane of the second negative electrode layer where the second current collecting layer is not laminated thereto, or a main plane of the second electrolyte layer where the first negative electrode layer is not laminated thereto and a main plane of the second positive electrode layer where the first current collecting layer is not laminated thereto; and the first current collecting layer has ionic conductivity, said ionic conductivity being $10^{-7}$ S/cm or lower, and each of the first insulating layer and the second insulating layer has ionic conductivity, said ionic conductivity being $10^{-7}$ S/cm or lower.

18. A manufacturing method for a solid battery, the manufacturing method comprising:

applying a first electrolyte layer to a first release film;

laminating a first positive electrode layer, a first current collecting layer, and a second positive electrode layer on the first electrolyte layer in this order to obtain a first laminate body;

connecting a first insulating layer to at least part of a side surface portion of the first laminate body;

applying a third electrolyte layer to a third release film;

laminating a third negative electrode layer on the third electrolyte layer;

connecting a third insulating layer to at least part of a side surface portion of the third laminate body to obtain a third laminate body;

releasing the first release film from the first laminate body;

releasing the third release film from the third laminate body; and laminating the first laminate body and the third laminate body along a main plane of the first electrolyte layer where the first positive electrode layer is not laminated thereto and a main plane of the third negative electrode layer where the third electrolyte layer is not laminated thereto, or along a main plane of the third electrolyte layer where the third negative electrode layer is not laminated thereto and a main plane of the second positive electrode layer where the first current collecting layer is not laminated thereto; and the first current collecting layer has ionic conductivity, said ionic conductivity being $10^{-7}$ S/cm or lower, and each of the first insulating layer and the third insulating layer has ionic conductivity, said ionic conductivity being $10^{-7}$ S/cm or lower.

* * * * *